(12) United States Patent
Fujimoto

(10) Patent No.: US 7,260,613 B2
(45) Date of Patent: *Aug. 21, 2007

(54) STORAGE SYSTEM, DISK CONTROL CLUSTER INCLUDING CHANNEL INTERFACE UNITS, DISK INTERFACE UNITS, LOCAL SHARED MEMORY UNITS, AND CONNECTION PORTIONS, AND A METHOD OF INCREASING OF DISK CONTROL CLUSTER

(75) Inventor: Kazuhisa Fujimoto, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 357 days.

This patent is subject to a terminal disclaimer.

(21) Appl. No.: 11/006,592

(22) Filed: Dec. 8, 2004

(65) Prior Publication Data

US 2005/0097269 A1 May 5, 2005

Related U.S. Application Data

(63) Continuation of application No. 10/067,332, filed on Feb. 7, 2002, now Pat. No. 6,868,438.

(30) Foreign Application Priority Data

Sep. 26, 2001 (JP) ............................ 2001-294048

(51) Int. Cl.
*G06F 15/167* (2006.01)
*G06F 13/00* (2006.01)

(52) U.S. Cl. ............... 709/213; 709/229; 711/112; 711/147; 710/38; 710/305; 710/316; 710/317

(58) Field of Classification Search ........... 709/213, 709/229; 711/112, 147; 710/38, 305, 316, 710/317

See application file for complete search history.

(56) References Cited

U.S. PATENT DOCUMENTS

| 5,155,845 | A | 10/1992 | Beal et al. |
|---|---|---|---|
| 5,625,831 | A | 4/1997 | Priest et al. |
| 5,682,512 | A | 10/1997 | Tetrick |
| 6,216,179 | B1 | 4/2001 | Murata et al. |
| 6,449,700 | B2 | 9/2002 | Hagersten et al. |
| 6,505,257 | B2 | 1/2003 | Murata et al. |
| 2001/0044883 | A1 | 11/2001 | Abe et al. |
| 2002/0083299 | A1 | 6/2002 | Van Huben et al. |
| 2002/0095549 | A1 | 7/2002 | Matsunami et al. |
| 2002/0133675 | A1 | 9/2002 | Hirayama |
| 2003/0182516 | A1 | 9/2003 | Fujimoto |

*Primary Examiner*—Hong Kim
(74) *Attorney, Agent, or Firm*—Reed Smith LLP; Stanley P. Fisher, Esq.; Juan Carlos A. Marquez, Esq.

(57) ABSTRACT

In a storage system in which: LSW 110 is a local switch, GSW 115 is a global switch, and 21 is a global shared memory unit; when a host computer 3 makes a data read request to a disk control cluster 1-1, a channel interface unit 11 accesses to a local shared memory unit 22 via the LSW 110, and if the data exists in the disk control cluster 1-1, the channel interface unit 11 read the data from the local shared memory unit 22 or the disk drive 2 so as to transfer to the host computer 3. If the data is not in the disk control cluster 1-1, the channel interface unit 11 accesses to the global shared memory unit 21, check a disk control cluster with the requested data stored therein, obtains the requested data from the disk control cluster where the requested data is stored, and transfer the data to the host computer 3. This provides a storage system with a configuration of a desirable scalability and with architecture for high reliability and high performance of the disk control clusters that can deal with a wide range of configurations from a small-scale configuration to a super huge configuration

5 Claims, 16 Drawing Sheets

FIG.17

(BEFORE AN INCREASE OF A CLUSTER)

| GSW PORT NUMBER | CLUSTER NUMBER |
|---|---|
| 0 | 0 |
| 1 | 1 |
| 2 | 3 |
| 3 | 2 |
| 4 | NOT-CONNECTED |
| 5 | 4 |
| 6 | NOT-CONNECTED |
| 7 | NOT-CONNECTED |

400:CORRESPONDING TABLE BETWEEN A GSW PORT AND A CLUSTER NUMBER (AFTER AN INCREASE OF A CLUSTER)

| GSW PORT NUMBER | CLUSTER NUMBER |
|---|---|
| 0 | 0 |
| 1 | 1 |
| 2 | 3 |
| 3 | 2 |
| 4 | 5 |
| 5 | 4 |
| 6 | NOT-CONNECTED |
| 7 | NOT-CONNECTED |

400:CORRESPONDING TABLE BETWEEN A GSW PORT AND A CLUSTER NUMBER

FIG.18

(BEFORE AN INCREASE OF A CLUSTER)

402        406

| CLUSTER NUMBER | LOGICAL VOLUME NUMBER |
|---|---|
| 0 | 0~4095 |
| 1 | 4096~6143 |
| 2 | 12288~16383 |
| 3 | 6144~12287 |
| 4 | 16384~16639 |
| 5 | NOT-CONNECTED |
| 6 | NOT-CONNECTED |
| 7 | NOT-CONNECTED |

405:CORRESPONDING TABLE BETWEEN A CLUSTER NUMBER AND A LOGICAL VOLUME NUMBER (AFTER AN INCREASE OF A CLUSTER)

402        406

| CLUSTER NUMBER | LOGICAL VOLUME NUMBER |
|---|---|
| 0 | 0~4095 |
| 1 | 4096~6143 |
| 2 | 12288~16383 |
| 3 | 6144~12287 |
| 4 | 16384~16639 |
| 5 | 16640~20735 |
| 6 | NOT-CONNECTED |
| 7 | NOT-CONNECTED |

405:CORRESPONDING TABLE BETWEEN A CLUSTER NUMBER AND A LOGICAL VOLUME NUMBER

STORAGE SYSTEM, DISK CONTROL CLUSTER INCLUDING CHANNEL INTERFACE UNITS, DISK INTERFACE UNITS, LOCAL SHARED MEMORY UNITS, AND CONNECTION PORTIONS, AND A METHOD OF INCREASING OF DISK CONTROL CLUSTER

This application is a Continuation application of nonprovisional U.S. Ser. No. 10/067,332 filed on Feb. 7, 2002 which issued into U.S. Pat. No. 6,868,438 on Mar. 15, 2005. Priority is claimed based upon U.S. application Ser. No. 10/067,332 filed on Feb. 7, 2002, which claims the priority date of Japanese Patent Application 2001-294048 filed on Sep. 26, 2001.

BACKGROUND OF THE INVENTION

1. Field of Invention

The present invention relates to a storage system for storing data in a plurality of disk drives and disk conclusters composing the storage system.

2. Description of Related Art

I/O performance of a main memory of a computer having a semiconductor recording device as its recording medium is greater by 3 to 4 orders of magnitude than I/O performance of a disk subsystem (hereinafter, referred to as "subsystem") having a magnetic disk as its recording medium. Narrowing differences in performance, i.e., improvement of the I/O performance of the subsystem, has been an attempt for some time.

One way to improve the I/O performance of the subsystem is to include a plurality of disk drives for every subsystem to store data on a plurality of the disk drives. Such system is known as so called "disk array" system.

For example, FIG. 2 shows a conventional technique, in which, a system include: a plurality of channel interface units 11 for transferring data between a host computer 3 and a disk controller 4; a plurality of disk interface units 16 for transferring data between a disk drive 2 and the disk controller 4; and a shared memory unit 20 for storing control information about data on the disk drive 2 and a disk controller 4 (e.g., information about the data transfer control within the disk controller 4 and management information about data to be stored in the disk drive 2). In such system, the shared memory unit 20 within one disk controller 4 is accessible from all channel interface units 11 and disk interface units 16.

In the disk controller 4, an interconnection 30 connects between the channel interface units 11 and disk interface units and the shared memory unit 20.

The channel interface unit 11 has an interface to connect with the host computer 3 and a microprocessor (not shown) for controlling input and output to the host computer 3.

The disk interface unit 16 has an interface to connect with the disk drive 2 and a microprocessor (not shown) for controlling input and output to the disk drive 2. The disk interface unit 16 also performs a RAID function.

With a spread of the Internet and the like, business firms handles more and more data, and at a data center or the like, it becomes necessary to store an amount of data greater than one disk controller can deal with.

In order to deal with such a situation, a plurality of disk controllers 4 are used as shown in FIG. 2, and the interface to the host computer 3 thereof is connected to the host computer 3 via an SAN switch 5.

As the amount of data increases, a number of disk controllers 4 connecting to the SAN switch 5 increase. As a result, management of an entire system including the host computer 3 and the SAN switch 5 (the system is hereinafter referred to as a storage area network (SAN)) becomes more complicated.

The following process deals with the problem. First, an SAN appliance 6 is connected to the SAN switch 5. The SAN appliance 6 performs a directory service of data managed by all the disk controllers 4 connected to the SAN switch 5, so that a plurality of the disk controllers 4 appear to be one storage system with respect to the host computer 3. That is, a storage areas provided by individual disk controller 4 appear as one large storage area, and a required amount thereof is allocated to the host computer 3.

Big businesses such as banks, securities firms, and telecommunication companies tend to reduce costs required for operation, maintenance and management of a computer system and storage system by centralizing computers and storages distributed to different places in a data center or the like.

With such a trend, there is a demand for a large scale/high-end disk controller with a support (connectivity) of a channel interface for connecting with hundreds of host computers as well as a support for recording capacity exceeding hundreds of terabytes.

On the other hand, with expansion of an open market in recent years and spread of the storage area network (SAN) there is an increasing demand for a small-scale (compact) disk controller of rich function and high reliability equivalent to the large-scale/high-end disk controller.

To fulfill the former demand, a plurality of conventional large-scale/high-end disk controllers can be connected to form a super huge storage system.

For the latter demand, a smallest model of a conventional large-scale/high/end disk controller may form a device with a smaller rack used therefore.

Also, by connecting a plurality of the devices in smaller racks may provide a storage system for supporting a mid-sized or huge configuration, which is supported by the conventional disk controller.

As described above, there is an increasing need for a system with a scalability that can support a variety of configuration ranging from small-scaled to an ultra-huge with the same architecture with rich function and high reliability. To meet the need, there is a need for a storage system that can operate as one system by clustering a plurality of disk controllers.

In the conventional technique shown in FIG. 2, a plurality of disk controllers 4 are connected with the host computer 3 through the SAN switch 5, whereby the SAN appliance 6 makes the plurality of the disk controller 4 look as one storage system with respect to the host computer 3.

However, a software run on the SAN appliance 6 operates the plurality of the disk controllers 4 as one system, whereby reliability and availability gets lowered compared to a conventional single large-scale disk controller.

Moreover, the disk controller 4 with data requested from the host computer 3 is searched on the SAN appliance 6, whereby its performance is deteriorated.

An object of the present invention is to provide a storage system of a configuration with a scalability that can deal with configurations of wide range of sizes from small-scaled to ultra-huge scale with the same architecture of rich function and high reliability.

Specifically, the object of the present invention is to provide a high-performance and high reliability system used for a storage system using a plurality of disk controllers as single system.

SUMMARY OF THE INVENTION

To achieve the above described object, the present invention provides storage system, comprising: one or a plurality of channel interface units having an interface with a host computer; one or a plurality of disk interface unit having an interface with a disk drive; a local shared memory unit for storing control information about data to be read and written to the disk drive and transfer of said data and management information of the disk drive; a plurality of disk control cluster performing read/write of data with the channel interface unit transferring data between the interface of the host computer and the local shared memory unit corresponding to read/write request of data from the host computer, and with the disk interface unit transferring the data between the local shared memory unit and the disk drive; and a global shared memory unit for storing management information of disk control cluster, in which, the disk control cluster and another dick control cluster is connected by interconnection, and the interconnection connects to the global shared memory unit.

Moreover, it is achieved by a storage system in which a connection portion for connecting the channel interface unit and the disk interface unit and the local shared memory unit in each of the disk control cluster connects to the connecting portion of another disk control cluster via the interconnection.

It is also achieved by a storage system in which the channel interface unit and the disk interface unit in the disk control cluster directly connects to the local shared memory unit in the disk control cluster, and the local shared memory unit in each of the disk control cluster and the local shared memory unit in another disk control cluster are connected via the interconnection.

It is also achieved by a storage system in which the channel interface unit and the disk interface unit in each of the disk control cluster directly connects to the local shared memory unit in the disk control cluster, and connecting portion of the channel interface unit and the disk interface unit in each of the disk control cluster is connected with the connecting portion in another disk control cluster via the interconnection.

Moreover, the above object can be achieved by a storage system, comprising: one or a plurality of channel interface unit having an interface to a host computer, one or a plurality of disk interface unit having an interface to a disk drive, a plurality of disk control cluster having connection portion for connecting said one or plurality of the channel interface unit to said one or plurality of the disk interface unit, and a global shared memory unit for storing data to be read from and written to the disk drive and control information about transferring of said data, management information of the disk drive, management information of the disk control cluster, in which connecting portion in the disk control cluster and the connecting portion in another disk control cluster are connected with each other via an interconnection, and the interconnection connects to the global shared memory unit.

Furthermore, the above-described object is achieved by providing a storage system, comprising: one or a plurality of channel interface units having an interface with a host computer; one or a plurality of disk interface unit having an interface with a disk drive; a local shared memory unit having a first memory for storing data to be read from and written to the disk drive and a second memory for storing control information about data transfer between the channel interface unit and the disk interface unit and the first memory, and management information of the disk drive; a plurality of disk control cluster performing read/write of data with the channel interface unit transferring data between the interface of the host computer and the first memory in the local shared memory unit corresponding to read/write request of data from the host computer, and with the disk interface unit transferring the data between the first memory in the local shared memory unit and the disk drive; and a global shared memory unit for storing management information of disk control cluster, in which, the channel interface unit and the disk interface unit in the disk control cluster directly connects to the second memory of the local shared memory unit in the disk control cluster, a first connection portion of the disk interface unit and the channel interface unit in the respective disk control cluster and the first connection portion in another disk control cluster are connected with each other via an interconnection, the global shared memory unit connects to the first interconnection, a second connection portion, where the channel interface unit and the disk interface unit in the disk control cluster and the first memory of the local shared memory unit are connected, and the second connection portion in another disk control cluster are connected via a second interconnection.

The above-described object is further achieved by providing a storage system, comprising: one or a plurality of channel interface units having an interface with a host computer; one or a plurality of disk interface unit having an interface with a disk drive; a local shared memory unit having a first memory for storing data to be read from and written to the disk drive and a second memory for storing control information about data transfer between the channel interface unit and the disk interface unit and the first memory, and management information of the disk drive; a plurality of disk control cluster performing read/write of data with the channel interface unit transferring data between the interface of the host computer and the first memory in the local shared memory unit corresponding to read/write request of data from the host computer, and with the disk interface unit transferring the data between the first memory in the local shared memory unit and the disk drive; and a global shared memory unit for storing management information of disk control cluster, in which the channel interface unit and the disk interface unit in the disk control cluster directly connects to a second memory of the local shared memory unit in the disk control cluster, a first connection portion between the channel interface unit and the disk interface unit in the disk control cluster and the first connection portion of another disk control cluster are connected via a first interconnection, the global shared memory unit connects to the first interconnection, the channel interface unit and the disk interface unit in the disk control cluster directly connects to a first memory of the local shared memory unit in the disk control cluster, the first memory of the local shared memory unit in the disk control cluster and the first memory of the local shared memory unit in another disk control cluster are connected with each other via a second interconnection.

BRIEF DESCRIPTION OF THE DRAWINGS

FIG. 17 is a diagram showing one example of a configuration status of a storage system stored in a global shared memory unit portion; and FIG. 18 is a diagram showing another example of a configuration status of a storage system stored in a global shared memory unit portion.

DETAILED DESCRIPTION OF PREFERRED EMBODIMENTS

Hereinbelow, Embodiments of the present invention will be described with a reference to drawings.

Embodiment 1

FIGS. 1, 3, 12 and 13 show Embodiment 1 of the present invention.

In embodiment described below, an interconnection includes a switch as an example. However, as long as the interconnection transfers control information and data while being connected with each other, a bus, for example, may compose the interconnection.

Figure 1:
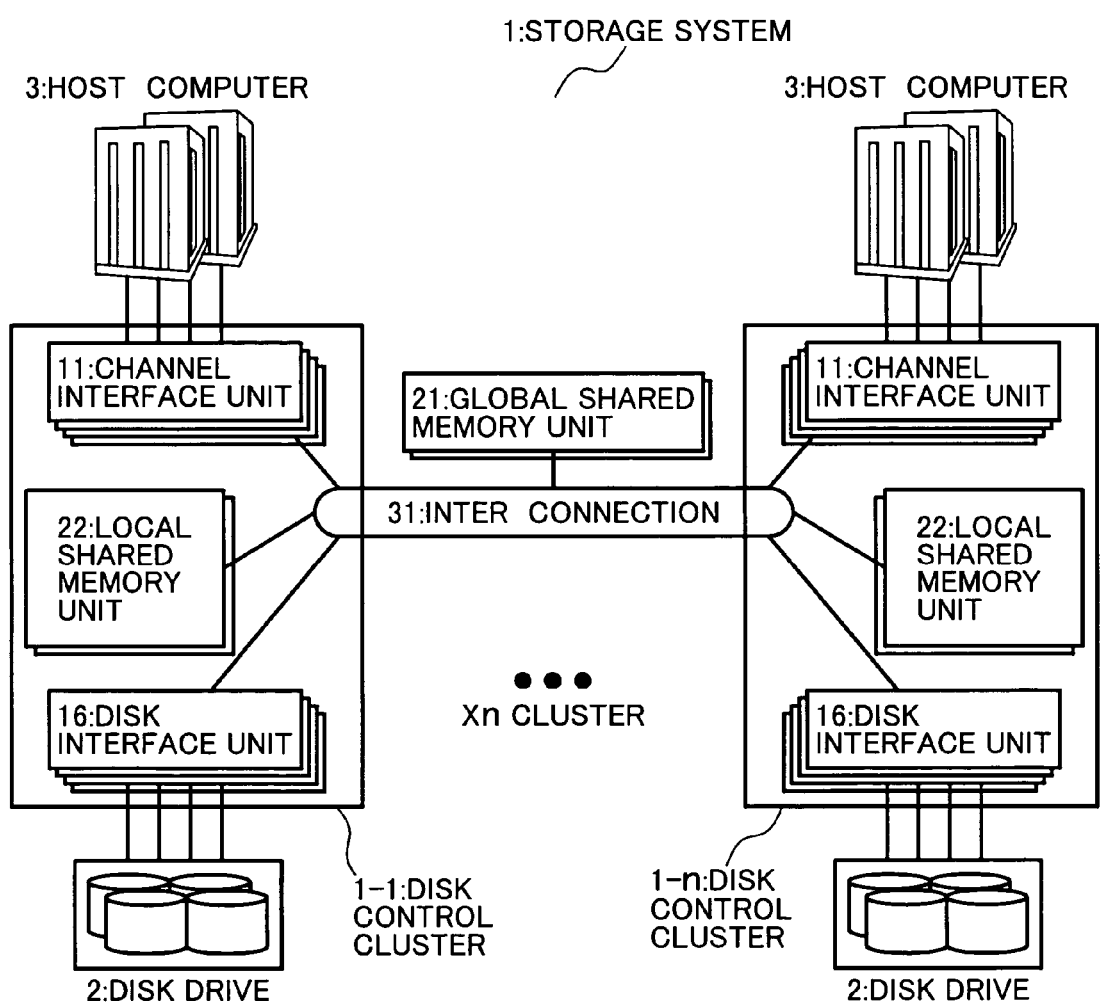
FIG. 1 is a diagram showing a configuration of a storage system of Embodiment 1 according to the present invention.
Figure 2:
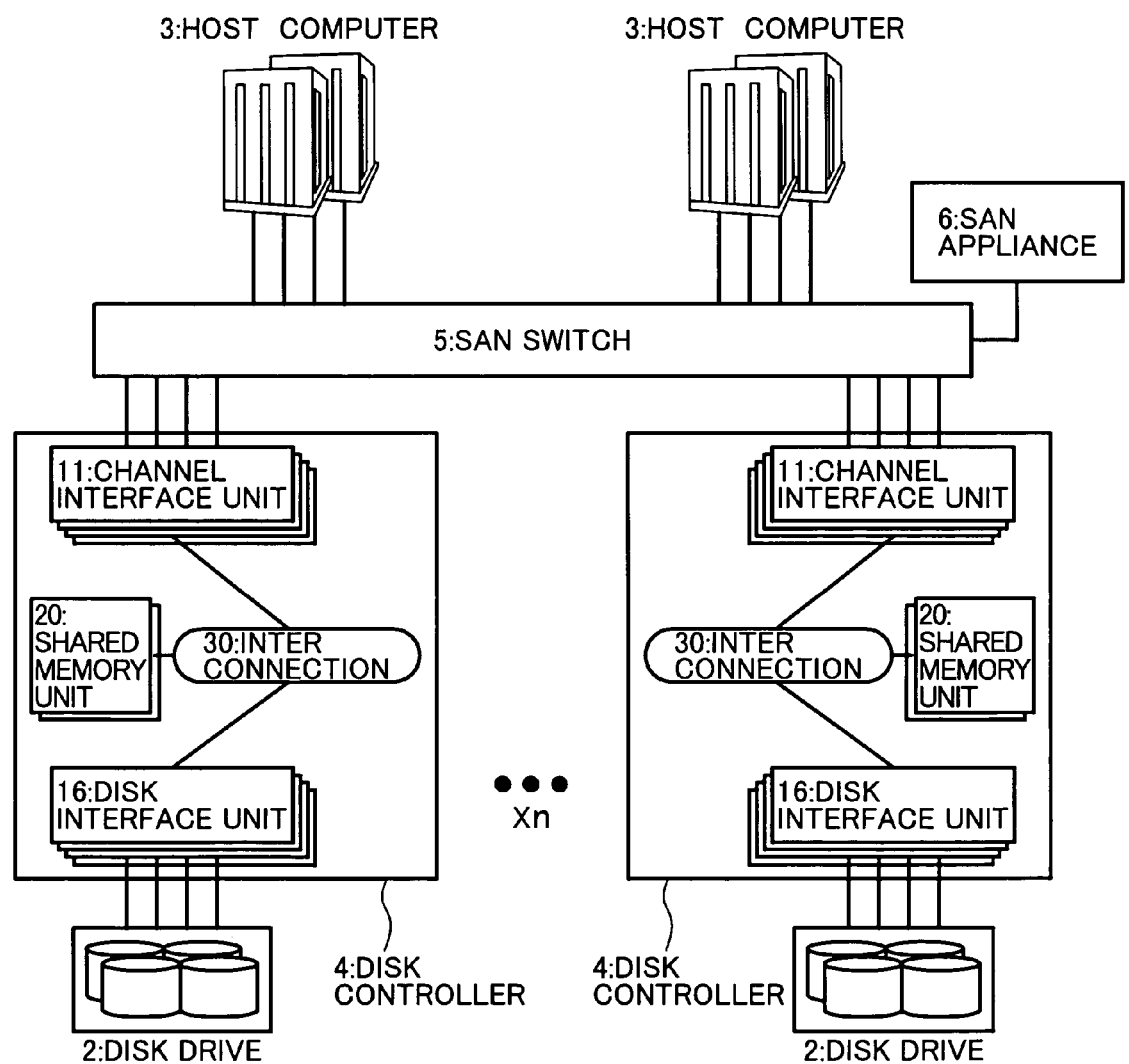
FIG. 2 is a diagram showing a configuration of a plurality of disk controllers in a conventional type.

As shown in FIG. 1, a storage system 1 includes a plurality of disk control clusters 1-1 to 1-n.

The disk control cluster 1-1 has interface portions (channel interface units) 11 to host computers 3, interface portions (disk interface units) 16 to disk drives 2, and local shared memory units 22. An interconnection 31 across the plurality of the disk control clusters 1-1 to 1-n connects between the channel interface units 11 and disk interface units 16 and the local shared memory units 22. Global shared memory units 21 connect with the interconnection 31.

Figure 12:
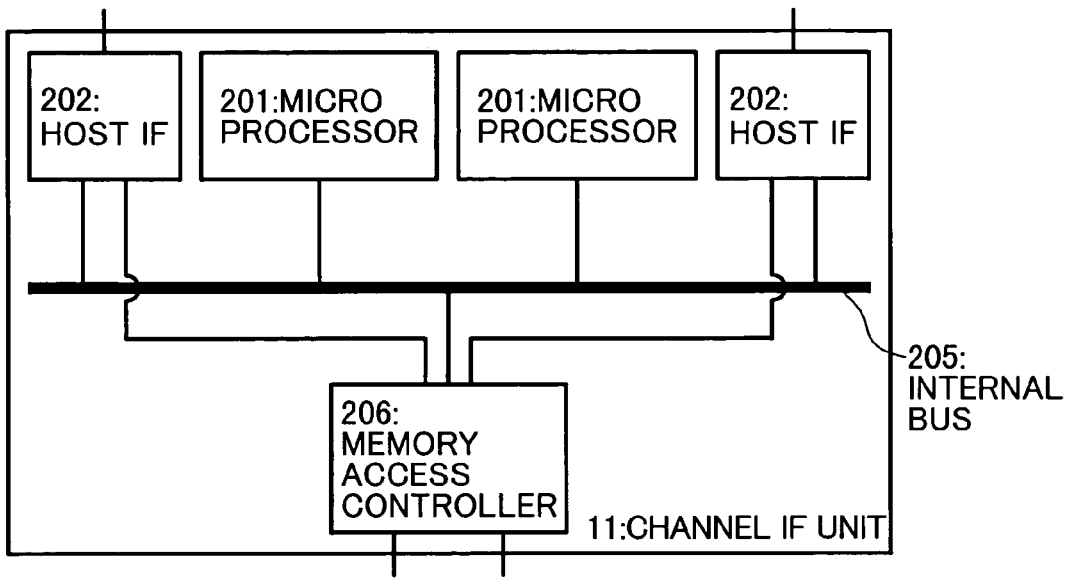
FIG. 12 is a diagram showing a configuration of a channel interface unit composing a storage system according to the present invention.

Specifically, through the interconnection 31, the global shared memory unit 22 is accessible from all the channel interface units 11 and disk interface units 12. FIG. 12 shows a specific example of the channel interface unit 11.

The channel interface unit 11 has two interfaces (host interfaces) 202 to the host computers 3, two microprocessors 201 for controlling input to and output from the host computers 3, and an access controller (memory access controller) 206 for controlling access to the global shared memory units 21 or the local shared memory units 22. The channel interface unit 11 transfers data between the host computer 3 and the global shared memory unit 21 or the local shared memory unit 22. Also, it transfers control information between the microprocessor 201 and the global shared memory unit 21 or the local shared memory unit 22.

An internal bus 205 connects the microprocessors 201 and the host interfaces 202. The memory access controller 206 directly connects to the host interfaces 202, and connects to the internal bus 205 also.

Figure 13:
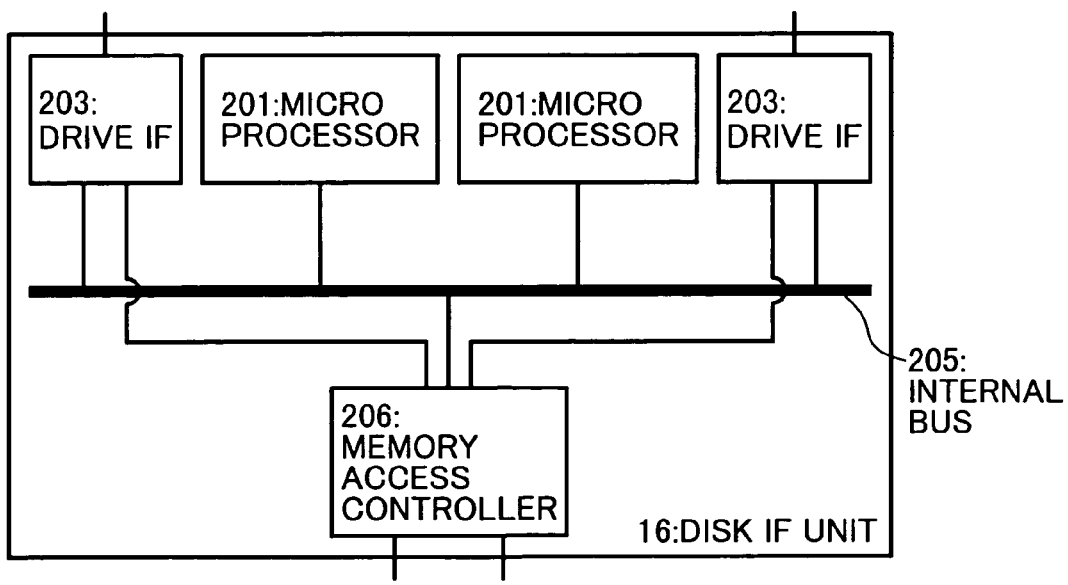
FIG. 13 is a diagram showing a configuration of a disk interface unit composing a storage system according to the present invention.

FIG. 13 shows a specific example of the disk interface unit 16.

The disk interface unit 16 has two interfaces (drive interfaces) 203 to the disk drives 2, two microprocessors 201 for controlling input to and output from the disk drives 3, and an access controller (memory access controller) 206 for controlling access to the global shared memory units 21 or the local shared memory units 22. The disk interface unit 11 transfers data between the disk drives and the global shared memory units 21 or the local shared memory units 22. Also, it transfers control information between the microprocessors 201 and the global shared memory units 21 or the local shared memory units 22.

An internal bus 205 connects the microprocessors 201 and the drive interfaces 203. The memory access controller 206 directly connects to the drive interfaces 203, and connects to the internal bus 205 also.

Moreover, the disk interface unit 16 performs execution of a RAID function.

One disk control cluster is composed as a rack or a module, but it functions as a disk controller thereof.

Figure 3:
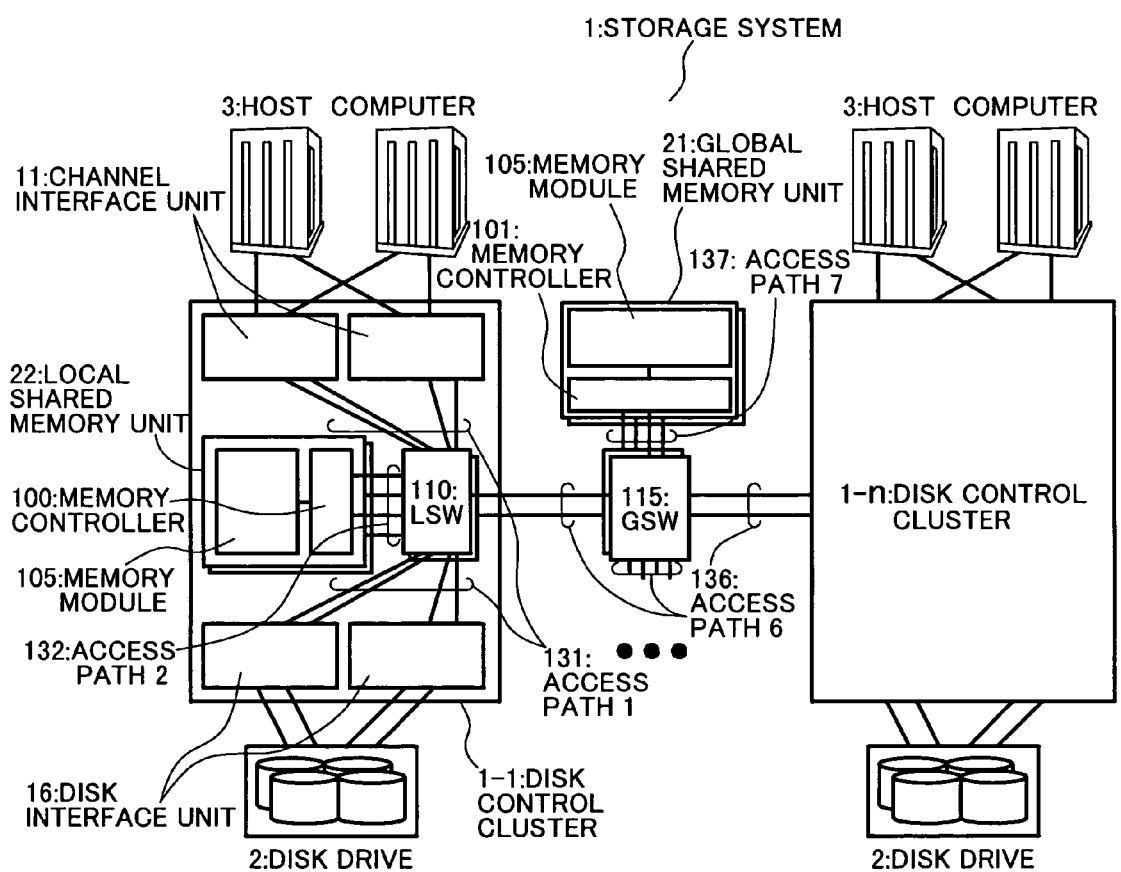
FIG. 3 is a diagram showing in detail a configuration of the storage system shown in FIG. 1.

FIG. 3 shows a specific example of a storage system. A storage system 1 has a plurality of disk control clusters 1-1 to 1-n, two global shared memory units 21 and two global switches (GSW) 115, access paths 136 and access paths 137.

The global switch 115 is a connecting portion for connecting paths from the global shared memory units 21 and paths from the plurality of disk control clusters. The disk control clusters 1-1 to 1-n have two channel interface units 11 to the host computers 3, two disk interface unit 16 to the disk drives 2, two local switches (LSW) 110, two local shared memory units 22, access paths 131, access paths 132, and access paths 136.

The global shared memory unit 21 has a memory controller 101 and a memory module 105, and stores management information of the disk control clusters 1-1 to 1-n (the management information herein includes, for example, information on storage areas which the disk control cluster manages, operation status of the disk control clusters, and configuration information thereof).

The local switch 110 is a connecting portion for connecting paths from the channel interface units, paths from the disk interface units, and paths from the local shared memory units. The local shared memory unit 22 has the memory controller 100 and the memory module 105, and stores control information of the disk control clusters and data recorded on the disk drives 2. The control information includes, for example, information about data transfer control between the channel interface units 11 and disk interface units 16 and the local shared memory units 22, and management information of the data recorded on the disk drives 2.

The memory access controller 206 in the channel interface unit 11 has two access paths 131 connected thereto, each being connected to two different LSWs 110. Two access paths 132 connect with LSW 110, and each access path 132 connect to the memory controller 100 in the two different local shared memory units 22.

Thus, the memory controller 100 has two access paths 132 connected thereto each from two different LSWs 110.

By providing the above connections, there are two access routes, from one memory access controller 206 to one memory controller 100.

Therefore, even if a fault has occurred to one of the access paths or LSW 110, an access to the local shared memory unit 22 is still possible with another access route, thereby improving fault tolerance thereof.

Total of four access paths 131 connects to LSW 110, each from two channel interface units 11 and two disk interface units 16.

Moreover, two access paths 132 to two local shared memory units 22 connects to LSW 110, and one access path 136 to the GSW 115 connects to it as well.

The access paths described above are connected to the LSW 110. Thus, the LSW 110 has a function therewithin to direct requests from four access paths from the channel interface units 11 and the disk interface units 16 to two access paths to the local shared memory units 22 within its own disk control cluster, and the access path 136 to the GSW 115.

To the GSW 115, there are access paths 136 connected thereto, one each from respective disk control cluster. A number of access paths 136 connected to the GSW 115 are the same as a number of disk control clusters.

Two access paths 137 connects with GSW 115, each access path to the memory controller 101 in the two different global shared memory units 21.

By providing the above connections, there are two access routes from one of the memory access controller 260 to one of the memory controller 101.

Therefore, even if a fault has occurred to one of the access paths, LSW 110, or GSW 115, an access to the global shared memory unit 21 is still possible with another access route, thereby improving fault tolerance thereof.

The access paths 136 may directly connects to the memory controller 101 without using the GSW 115 when applying the present invention.

Whereby, it becomes possible to eliminated overhead of data transfer process occurred at the GSW 115, thereby improving the performance thereof.

If the GSW 115 is not used, to secure two access routes from one of the memory access controllers 206 to one of the memory controller 101 and to improve fault tolerance, two access paths 136 connects to the LSW 110, each of access paths to be connected to the memory controller 101 in the two different global shared memory units.

In FIG. 3, the LSW 110 is connecting the channel interface units 11 and disk interface units to the local shared memory units 22, and the GSW 115 is connecting the disk control clusters 1-1 to 1-n to the global shared memory units.

In FIG. 3, the GSW 115 and the global shared memory unit 21 may be mounted in a box, and provided in one rack together with each of modularized disk control clusters 1-1 to 1-n.

Alternatively, each of the disk control clusters 1-1 to 1-n may be distributed as a separate rack to distant places, which is separated from each other with some distance therebetween.

With reference to FIG. 3, an example of reading data recorded in a storage system 1 from a host computer 3 connected to the disk controller 1-1 will be described.

First, the host computer 3 makes a request for reading of data to the channel interface unit 11 within the disk control cluster 1-1 connected with the host computer 3 themselves.

The microprocessor 201 within the channel interface unit 11 receives the request and accesses to the local shared memory unit 22 within its own disk control cluster 1-1 so as to check in which disk drive 2 the requested data is stored.

The local shared memory unit 22 stores a conversion table which shows addresses that are actually recorded in the disk drives 2 corresponding to the address of the requested data. Thus, the microprocessor 201 can check which disk drive has the requested data therewithin.

When the requested data exists in the disk drive 2 connected to own disk control cluster 1-1, the microprocessor 201 in the channel interface unit 11, that received the request, accesses to the local shared memory unit 22 in its own disk control cluster 1-1 to check if the requested data is stored in the local shared memory unit 22.

The local shared memory unit 22 stores data to be stored in the disk drive 2 and directory information thereof, and thus, it is possible to check if the local shared memory unit 22 has the requested data stored therein.

Accordingly, when the data is in the local shared memory unit 22 of the disk control cluster 1-1, the microprocessor 201 accesses to the local shared memory unit 22 to transfer data through its own LSW 110 to the channel interface unit 11, and finally to the host computer 3.

If the data does not exists in the local shared memory unit 22 of its own disk control cluster 1-1, the microprocessor 201 in the channel interface unit 11 gives control information to a microprocessor 201 in a disk interface unit 16 connected with a disk drive 2 with the requested data stored therein. The control information contains information on how to process the data request, i.e., reading the requested data from the disk drive 2 and storing it in the local shared memory unit 22. The microprocessor 201 in the disk interface unit 16 receives the control information, reads the data from the disk drive 2 where the requested data is stored, and transfers the requested data to the local shared memory unit 22 in its own disk control cluster 1-1 via the LSW 110 so as to store therein.

Specifically, the microprocessor 201 in the channel interface unit 11 issues control information showing how to process the above data request, and stores it into a control information block (job control block) in the local shared memory unit 22.

The microprocessor 201 in the disk interface unit 16 watches the control information block of the local shared memory unit 22 by polling. When the issued control information described above exists in the above-described control information block (job control block), the microprocessor 201 in the disk interface unit 16 reads the data from the disk drive 2 with the requested data stored therein, and transfers the requested data to the local shared memory unit 22 in its own disk control cluster 1-1 via the LSW 110 so as to store therein.

After storing the requested data in the local shared memory unit 22, the microprocessor 201 in the disk interface unit 16 informs the address in the local shared memory unit 22 in which the data is stored to the microprocessor 201 in the channel interface unit 11 that issued the control information via the control information block in the local shared memory unit 22. The microprocessor 201 in the channel interface unit 11 receives the information, reads the data from the local shared memory unit 22, and transfers it to the host computer 3.

Specifically, the microprocessor 201 in the disk interface unit 16 issues control information describing a completion of the process and the address where the data is stored after storing the requested data in the local shared memory unit 22 so as to store it into the control information block in the local shared memory unit 22. The microprocessor 201 in the channel interface unit 11, which issued the control information, watches the control information block in the local shared memory unit 22 by polling.

If the control information issued by the microprocessor 201 in the disk interface unit 16 exists, the microprocessor 201 reads the data from the local shared memory unit 22 according to the address of the data stored in the local shared memory unit 22, transfers it to the channel interface unit 11, and further transfers to the host computer 3.

When the disk drives 2 connected to the disk control cluster 1-1 does not have the requested data stored therein, the microprocessor 201 in the channel interface unit 11 that received the request accesses to the global shared memory unit 21 to search for a disk control cluster having a disk drive connected thereto with a requested data stored therein.

The global shared memory unit 22 has a conversion table stored therein. The conversion table shows which disk control cluster connected to a disk drive with a requested data corresponds the address of the requested data, thereby the microprocessor 201 can search which disk control cluster has the requested data stored therein.

When the disk drive 2 connected to the disk control cluster 1-n has the requested data stored therein, the microprocessor 201 in the channel interface unit 11, which received the request, requests the disk control cluster 1-n via the global shared memory unit 21 that the requested data to be stored in the local shared memory unit 22 in the disk control cluster 1-n.

The global shared memory unit 21 has areas for storing control information for exchanging data requests between disk control clusters, which is divided for each disk control cluster to which a request is sent. The microprocessor 201 in the channel interface unit 11, that receives the request, stores the control information and the address of the requested data in an area for storing control information of the disk control cluster 1-n in the global shared memory unit 21. The control information contains information on a request to store the requested data in the local shared memory unit 22 in the disk control cluster 1-n.

The microprocessor 201 in the channel interface unit 11 or the disk interface unit 16 in the disk control cluster 1-n watches areas for storing the control information to its own disk control cluster in the global shared memory unit 21 by polling.

When the data request is within an area of the control information for requesting data, the microprocessor 201 in the channel interface unit 11 or the disk interface unit 16 in the disk control cluster 1-n checks if the requested data is stored in the local shared memory unit 22 in own disk control cluster 1-n.

The local shared memory unit 22 has data to be stored in the disk drives 2 and directory information of the data stored therein, and thus, it is possible to check if the requested data exists in the local shared memory unit 22.

If the data exists in the local shared memory unit 22 of its own disk control cluster 1-n, the microprocessor 201 in the channel interface unit 11, that received the data request, within the disk control cluster 1-1 receives information, via the global shared memory unit 21, that the local shared memory unit 22 in the disk control cluster 1-n has stored the data.

After receiving the information, the microprocessor 201 in the channel interface unit 11 that receives data request within the disk control cluster 1-1 reads the requested data from the local shared memory unit 22 in the disk control cluster 1-n via the GSW 115 and the LSW 110, transfers it to the channel interface unit 11, and further transfers to the host computer 3.

When the data does not exists within the local shared memory unit 22 in the disk control cluster 1-n, the microprocessor 201 in the channel interface unit 11 or the disk interface unit 16 in the disk control cluster 1-n issues control information to the microprocessor 201 in the disk interface unit 16 connected with the disk drive 2 with the requested data stored therein, and stores it into the control information block (job control block) in the local shared memory unit 22. The control information contains information on how to process data request, i.e., reading the requested data and storing it in the local shared memory unit 22.

The microprocessor 201 in the disk interface unit 16 watches the control information block in the local shared memory unit 22 by polling. If the control information issued as described above exists in the above-described control information block (job control block), the microprocessor 201 in the disk interface unit 16 reads the data from the disk drive 2 where the requested data is stored, and transfers the requested data to the local shared memory unit 22 in its own disk control cluster 1-n via the LSW 110 so as to store therein.

The process thereafter is similar to the process done in a case where the requested data is in the above-described local shared memory unit 22.

According to the present embodiment, the host computer 3 can read and write data without knowing where the requested data is stored in a disk drive 2 connected to which disk control cluster, simply by issuing access request to the disk control cluster of its own, thereby enabling to make a plurality of disk control clusters 1-1 to 1-n appear as one storage system to the host computer 3.

Moreover, it becomes possible to provide a storage system with a scalability whereby highly reliable and high-performance architecture of single disk control cluster can deal with a wide variety of configurations, from a small scale configuration with only one disk control cluster to super-huge configuration with several tens of disk control clusters connected to each other.

Embodiment 2

FIGS. 4, 5, 12 and 13 show Embodiment 2 according to the present invention.

Figure 4:
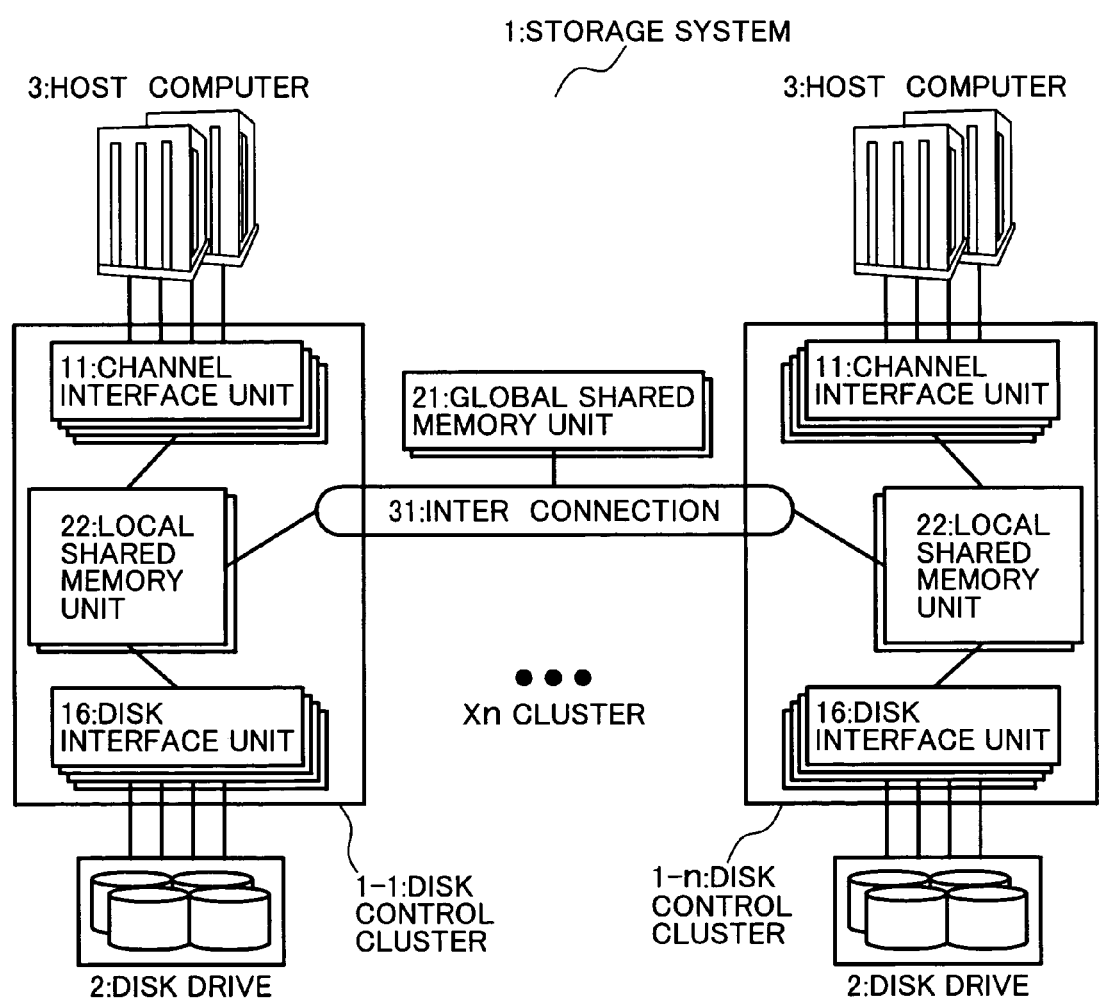
FIG. 4 is a diagram showing a configuration of a storage system of Embodiment 2 according to the present invention.

As shown in FIG. 4, a configuration of a storage system 1 including a disk controlling unit 1-1 to 1-n is similar to a configuration of Embodiment 1 as shown in FIG. 1 except connection between the channel interface unit 11 and disk interface unit 16 and the local shared memory unit 22 and connection between the channel interface unit 11 and disk interface unit 16 and the interconnection 31.

The channel interface unit 11 and the disk interface unit 16, directly connect to the local shared memory unit 22 in the disk control cluster. The local shared memory unit 22 is connected between a plurality of the disk control clusters 1-1 to 1-n via the interconnection 31, which connects to the global shared memory unit 21.

As described above, in Embodiment 2, the channel interface unit 11 and the disk interface unit 16 directly connect to the local shared memory unit 22 in the disk control units 1-1 to 1-n, thereby an accessing time to the local shared memory unit 22 becomes shorter than connecting them via the interconnection 31 as shown in Embodiment 1.

The configuration of the channel interface unit 11 and the disk interface unit 16 are similar to the configuration of Embodiment 1 as respectively shown in FIG. 12 and FIG. 13.

One disk control cluster may be composed as a rack or a module, but it functions as a disk controller thereof.

Figure 5:
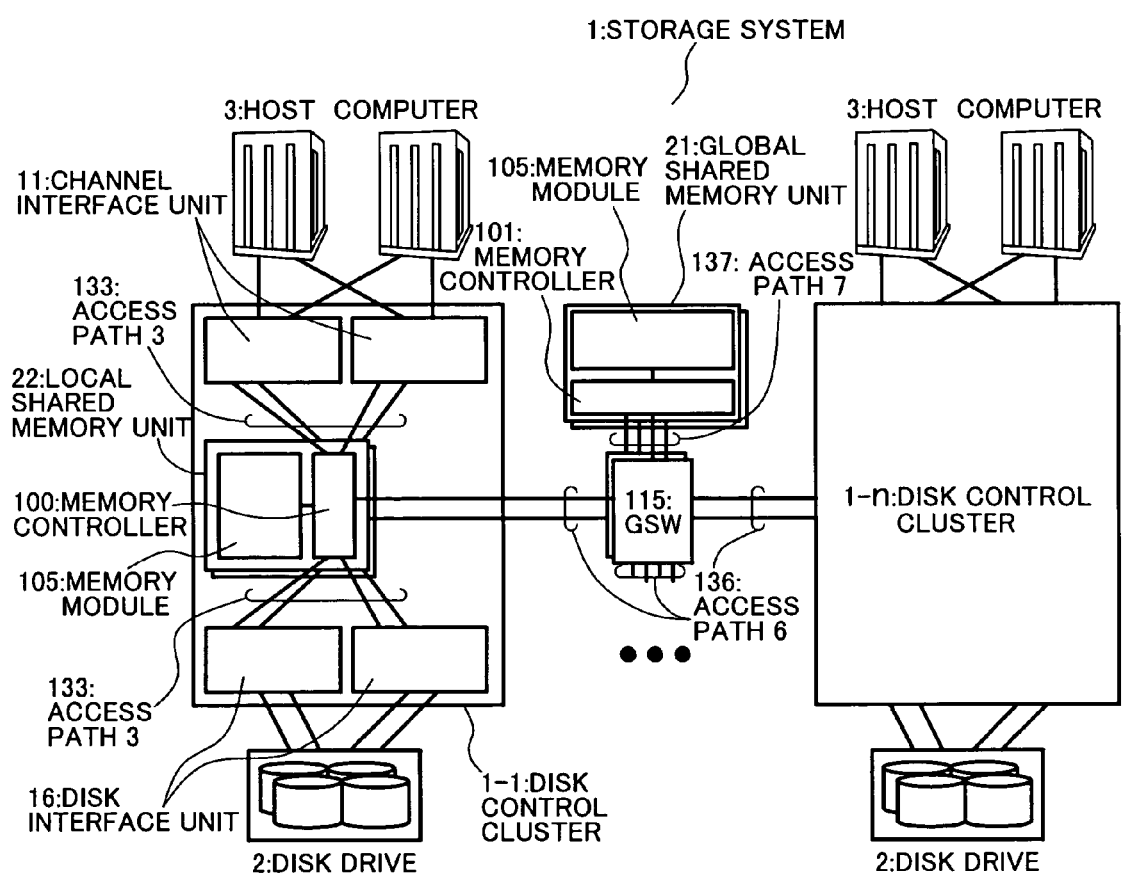
FIG. 5 is a diagram showing in detail a configuration of the storage system of Embodiment 2 shown in FIG. 4.

FIG. 5 shows a specific example of a storage system 1.

The configuration in the disk control cluster 1-1 to 1-n is also similar to Embodiment 1 as shown in FIG. 3 except connection of the channel interface unit 11 and disk interface unit 16 and the local shared memory unit 22, and connection between the disk control cluster 1-1 to 1-n and a GSW 115.

The storage system 1 includes a plurality of disk control clusters 1-1 to 1-n, global shared memory units 21 and two global switches (GSW) 115, access paths 136 and access paths 137.

The disk control clusters 1-1 to 1-n include two channel interface units 11 to the host computers 3, two disk interface units 16 to the disk drives 2, two local shared memory units 22, access paths 133, and access paths 136.

Two access paths 133 connect to a memory access controller 206 in the channel interface unit 11, each of the access paths 133 respectively connects to two different memory controllers 100.

Thus, there are four access paths 133 connected to the memory controller 100, each from two channel interface units 11 and from two disk interface units 16. Moreover, one access path 136 connected to the memory controller 100 connects to the GSW 115.

Because the memory controller 100 has the above-described access paths connected thereto, the memory controller 100 has a function therewithin to direct requests from four access paths 133 from the channel interface units 11 and the disk interface units 16 to the access path to the memory module 105 and the access path 136 to the GSW 115.

The access paths 136 may directly connects to the memory controller 101 without using the GSW 115 when applying the present invention, similarly to Embodiment 1. Whereby, it becomes possible to eliminate overhead of data transfer process occurred at the GSW 115, thereby improving the performance thereof.

If the GSW 115 is not used, to secure two access routes from one of the memory controllers 100 to one of the memory controllers 101 and to improve fault tolerance, two access paths 136 connects to the memory controller 100, each of access paths connecting with the memory controller 101 in the two different global shared memory units.

Moreover, likewise to Embodiment 1, in FIG. 5, the GSW 115 and the global shared memory unit 21 may be mounted in a box, and provided in one rack together with each of modularized disk control clusters 1-1 to 1-n. Alternatively, each of the disk control clusters 1-1 to 1-n may be distributed as a separate rack to distant places which is separated from each other with some distance therebetween.

In the present embodiment, when reading/writing of data from the host computer 3 to the storage system 1, each units within the storage system 1 operates similarly to Embodiment 1 except that the channel interface unit 11 and the disk interface unit 16 gains direct access to the local shared memory unit 22, and the channel interface unit 11 and the disk interface unit 16 gains access to the global shared memory unit 21 via the memory controller 100.

According to the present embodiment, the host computer 3 can read and write data without knowing where the requested data is stored in a disk drive 2 connected to which disk control cluster, simply by issuing access request to the disk control cluster of its own, thereby enabling to make a plurality of disk control clusters 1-1 to 1-n appear as one storage system to the host computer 3.

Moreover, it becomes possible to provide a storage system with a scalability whereby highly reliable and high-performance architecture of single disk control cluster can deal with a wide variety of configurations, from a small scale configuration with only one disk control cluster to super-huge configuration with several tens of disk control clusters connected to each other.

Embodiment 3

FIGS. 6, 7, 12 and 13 show Embodiment 3 according to the present invention.

Figure 6:
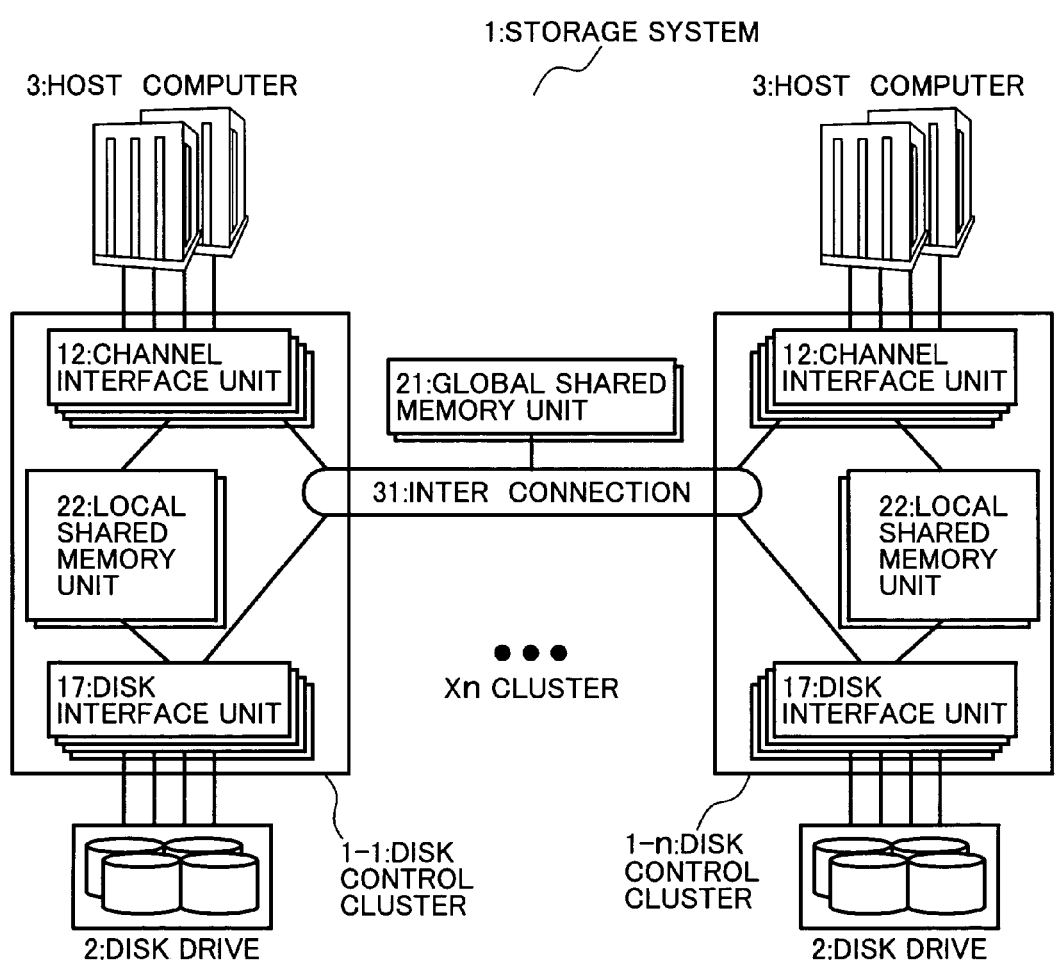
FIG. 6 is a diagram showing a configuration of a storage system of Embodiment 3 according to the present invention.

As shown in FIG. 6, a configuration of a storage system 1 including a disk controlling units 1-1 to 1-n is similar to a configuration of Embodiment 1 as shown in FIG. 1 except connection between the channel interface unit 12 and disk interface unit 17 and the local shared memory unit 22.

The channel interface unit 12 and the disk interface unit 17, directly connect to the local shared memory unit 22 in the disk control cluster.

The channel interface unit 12 and the disk interface units 17 are connected between a plurality of the disk control clusters 1-1 to 1-n via the interconnection 31 which connects to the global shared memory unit 21.

As described above, in Embodiment 3, the channel interface unit 12 and the disk interface unit 17 directly connect to the local shared memory unit 22 in the disk control units 1-1 to 1-n, thereby an accessing time to the local shared memory unit 22 becomes shorter than connecting them via the interconnection 31 as shown in Embodiment 1.

The configuration of the channel interface unit 12 and the disk interface unit 17 are similar to the configuration of Embodiment 1 as respectively shown in FIG. 12 and FIG. 13, except a number of access paths of the memory access controller 206 is increased to four.

Figure 7:
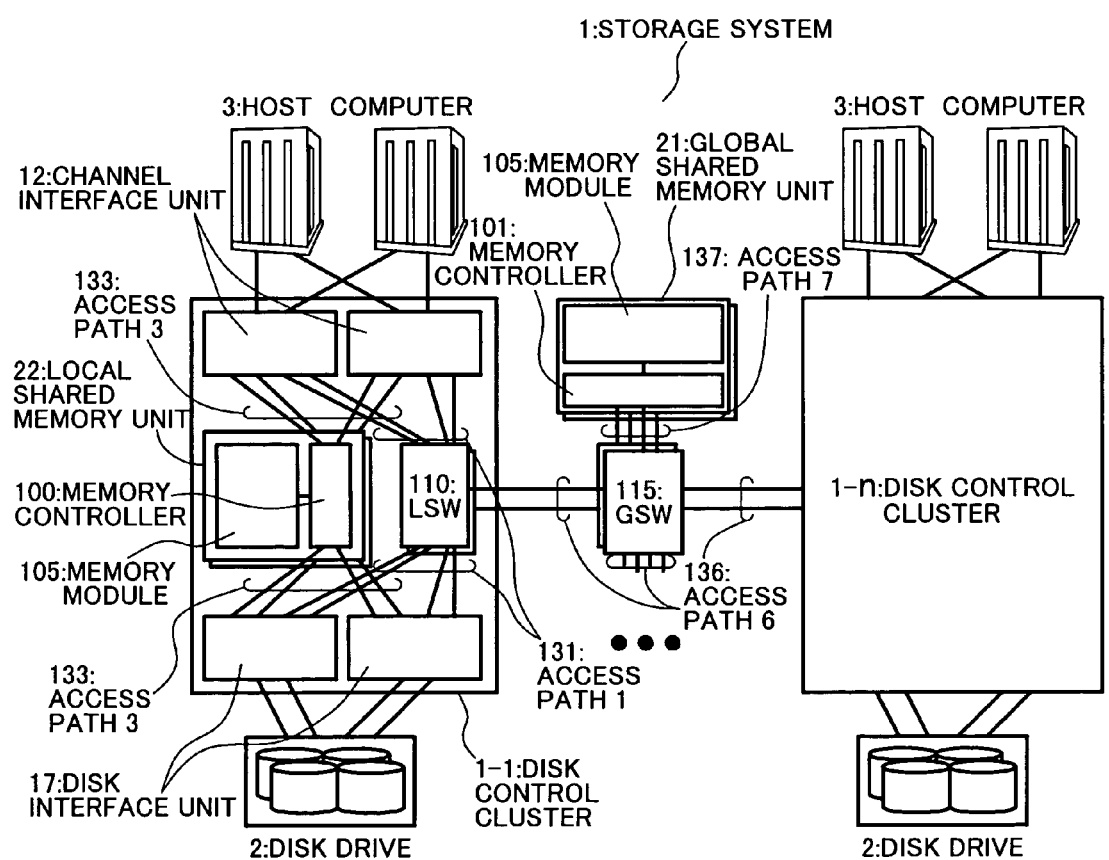
FIG. 7 is a diagram showing in detail a configuration of the storage system of Embodiment 3 shown in FIG. 6.

Herein, of four access paths, two of them are access paths 131 while the rest of two are access pates 133 (see FIG. 7).

One disk control cluster may be composed as a rack or a module, but it functions as a disk controller thereof.

FIG. 7 shows a specific example of a storage system 1.

The configuration in the disk control clusters 1-1 to 1-n is also similar to Embodiment 1 as shown in FIG. 3 except connection of the channel interface units 12 and disk interface units 17 and the local shared memory unit 22.

The storage system 1 includes a plurality of disk control clusters 1-1 to 1-n, global shared memory units 21 and two global switches (GSW) 115, access paths 136 and access paths 137.

The disk control clusters 1-1 to 1-n include two channel interface units 12 to the host computers 3, two disk interface units 17 to disk drives 2, two local switches (LSW) 110, two local shared memory units 22, access paths 131, access paths 133, and access paths 136.

The local switch 110 is a connecting portion for connecting a path from the channel interface unit and a path from the disk interface unit.

Two access paths 133 connect to a memory access controller 206 in the channel interface unit 12 and the disk interface unit 17, each of the access paths 133 respectively connects to two different memory controllers 100. Thus, there are four access paths 133 connected to the memory controller 100, each from two channel interface units 12 and from two disk interface units 17.

Two access paths 131 connect to the memory access controller 206 in the channel interface unit 12 and the disk interface unit 17, each of the access paths 131 respectively connects to two different LSWs 110. Thus, there are four access paths 131 connected to the LSW 110, each from two channel interface units 12 and from two disk interface units 17. Moreover, one access path 136 connected to the LSW 110 connects to the GSW 115.

The access paths 136 may directly connect to the memory controller 101 without using the GSW 115 when applying the present invention, similarly to Embodiment 1. Whereby, it becomes possible to eliminate overhead of data transfer process occurred at the GSW 115, thereby improving the performance thereof. If the GSW 115 is not used, to secure two access routes from one of the LSW 110 to one of the memory controllers 101 and to improve fault tolerance, two access paths 136 connects to the LSW 110, each of access paths connecting with different memory controller 101.

Moreover, likewise to Embodiment 1, in FIG. 7, the GSW 115 and the global shared memory unit 21 may be mounted in a box, and provided in one rack together with each of modularized disk control clusters 1-1 to 1-n. Alternatively, each of the disk control clusters 1-1 to 1-n may be distributed as a separate rack to distant places which is separated from each other with some distance therebetween.

In the present embodiment, when reading/writing of data from the host computer 3 to the storage system 1, each units within the storage system 1 operates similarly to Embodiment 1 except that the channel interface unit 12 and the disk interface unit 17 gains direct access to the local shared memory unit 22.

According to the present embodiment, the host computer 3 can read and write data without knowing where the requested data is stored in a disk drive 2 connected to which disk control cluster, simply by issuing access request to the disk control cluster of its own, thereby enabling to make a plurality of disk control clusters 1-1 to 1-n appear as one storage system to the host computer 3.

Moreover, it becomes possible to provide a storage system with a scalability whereby highly reliable and high-performance architecture of single disk control cluster can deal with a wide variety of configurations, from a small scale configuration with only one disk control cluster to super-huge configuration with several tens of disk control clusters connected to each other.

Embodiment 4

FIGS. 8, 9, 12, and 13 show Embodiment 4 according to the present invention.

Figure 8:
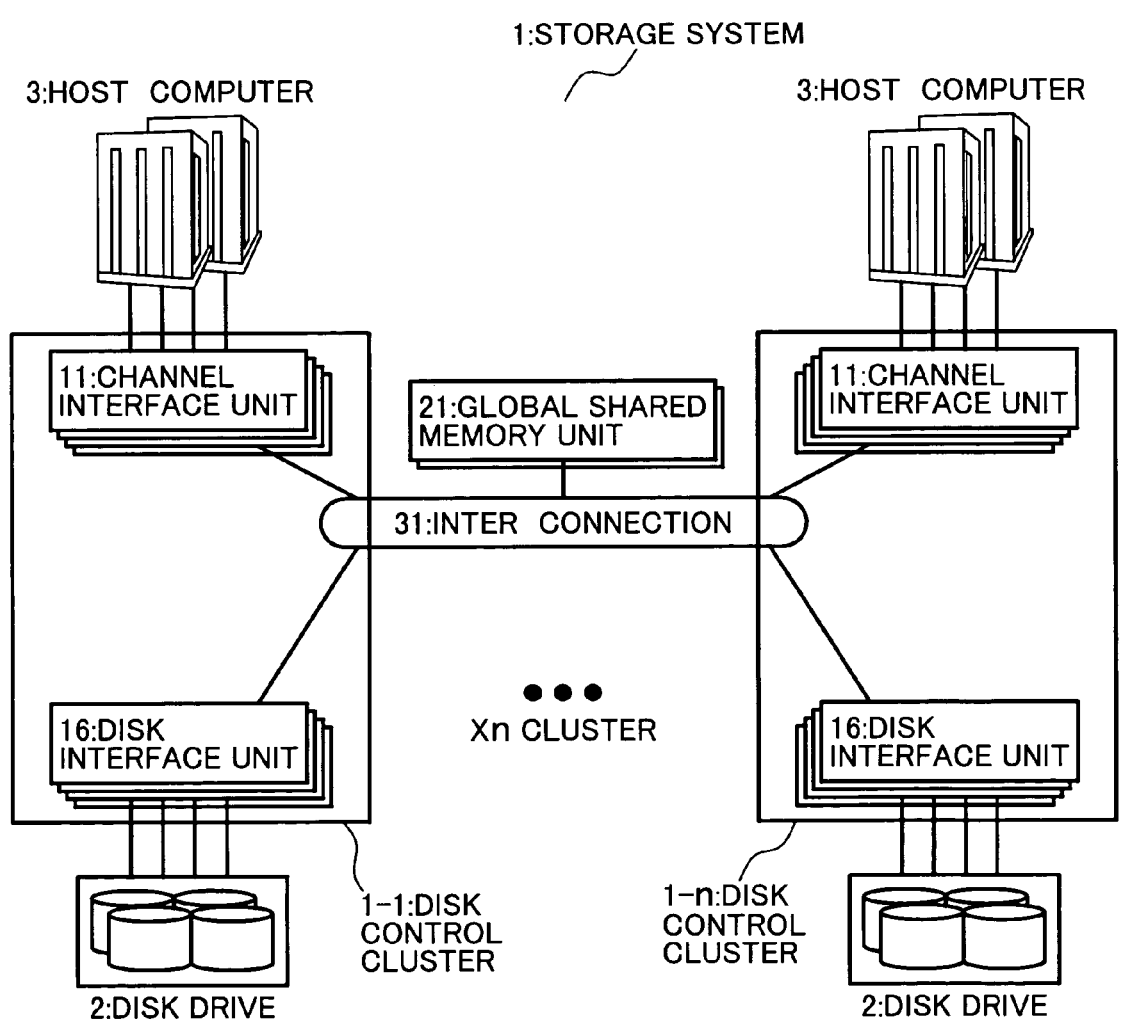
FIG. 8 is a diagram showing a configuration of a storage system of Embodiment 4 according to the present invention.

As shown in FIG. 8, a configuration of a storage system 1 including disk controlling units 1-1 to 1-n is the same as the configuration of Embodiment 1 without a local shared memory unit 22.

Because there is no local shared memory unit 22, the global shared memory unit 21 stores all the information that is stored in the local shared memory unit 22 of each disk control unit 1-1 to 1-n of Embodiment 1.

The channel interface unit 11 and the disk interface units 16 are connected between a plurality of the disk control clusters 1-1 to 1-n via the interconnection 31 which connects to a global shared memory unit 21.

The configuration of the channel interface unit 11 and the disk interface unit 16 are similar to the configuration of Embodiment 1 as respectively shown in FIG. 12 and FIG. 13.

One disk control cluster may be composed as a rack or a module, but it functions as a disk controller thereof.

Figure 9:
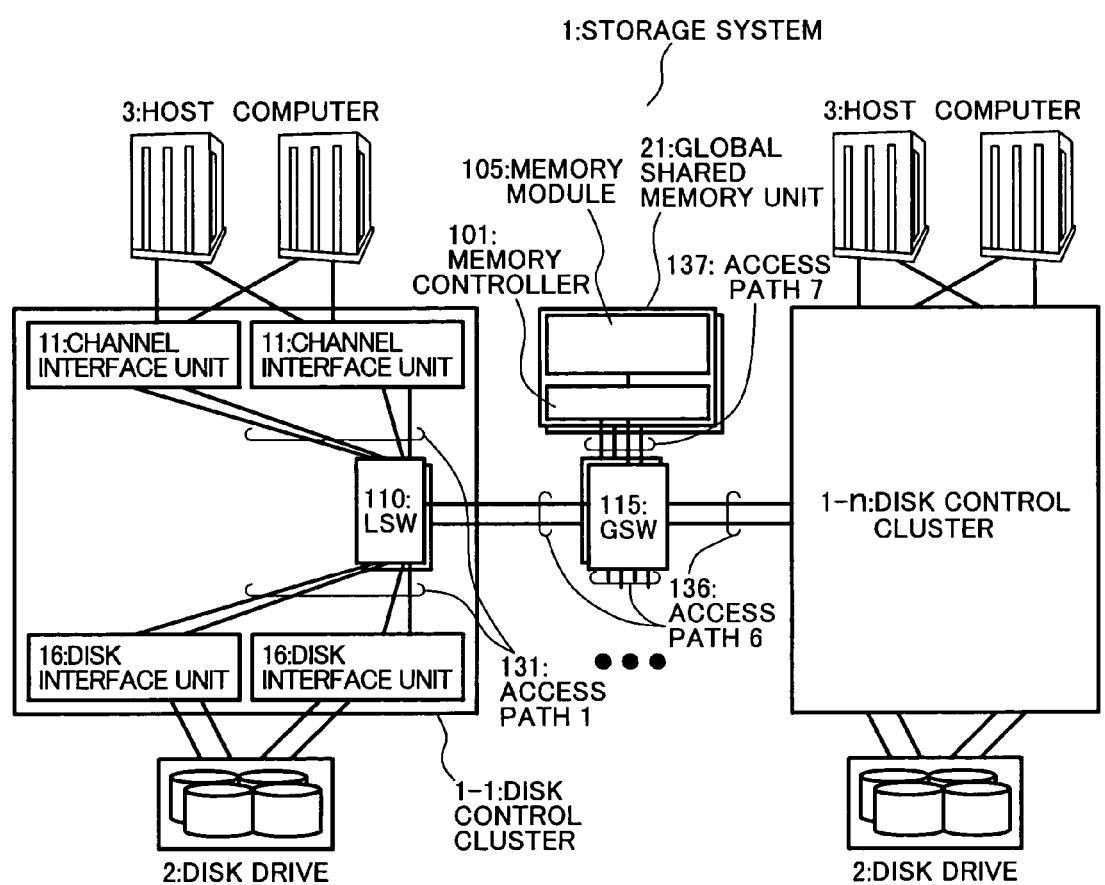
FIG. 9 is a diagram showing in detail a configuration of the storage system of Embodiment 4 shown in FIG. 8.

FIG. 9 shows a specific example of a storage system 1.

The configuration in the disk control clusters 1-1 to 1-n is also similar to Embodiment 1 as shown in FIG. 3 except that there is no local shared memory unit 22.

The storage system 1 includes a plurality of disk control clusters 1-1 to 1-n, global shared memory units 21, two global switches (GSW) 115, access paths 136 and access paths 137.

The disk control clusters 1-1 to 1-n include two channel interface unit 11 to the host computers 3, two disk interface unit 16 to the disk drives 2, two local switches (LSW) 110, access paths 131, and access paths 136.

The local switch 110 is a connecting portion for connecting a path from the channel interface unit with a path from the disk interface unit.

Two access paths 131 connect to a memory access controller 206 in the channel interface unit 11 and the disk interface unit 16, each of the access paths 131 respectively connects to two different LSWs 110.

Thus, there are four access paths 131 connected to the LSW 110, each from two channel interface units 11 and from two disk interface units 16.

Moreover, one access path 136 connected to the LSW 110 connects to the GSW 115.

The access paths 136 may directly connect to the memory controller 101 without using the GSW 115 when applying the present invention, similarly to Embodiment 1. Whereby, it becomes possible to eliminate overhead of data transfer process occurred at the GSW 115, thereby improving the performance thereof.

If the GSW 115 is not used, to secure two access routes from one of the LSW 110 to one of the memory controllers 101 and to improve fault tolerance, two access paths 136 connects to the LSW 110, each of access paths connecting with different memory controllers 101.

Moreover, likewise to Embodiment 1, in FIG. 9, the GSW 115 and the global shared memory unit 21 may be mounted in a box, and provided in one rack together with each of modularized disk control clusters 1-1 to 1-n. Alternatively, each of the disk control clusters 1-1 to 1-n may be distributed as a separate rack to distant places which is separated from each other with some distance therebetween.

In the present embodiment, when reading/writing of data from the host computer 3 to the storage system 1, each units within the storage system 1 operates similarly to Embodiment 1 except that all the process performed at the local shared memory unit 22 in Embodiment 1 is performed at the global shared memory unit 21.

According to the present embodiment, the host computer 3 can read and write data without knowing where the requested data is stored in a disk drive 2 connected to which disk control cluster, simply by issuing access request to the disk control cluster of its own, thereby enabling to make a plurality of disk control clusters 1-1 to 1-n appear as one storage system to the host computer 3.

Moreover, it becomes possible to provide a storage system with a scalability whereby highly reliable and high-performance architecture of single disk control cluster can deal with a wide variety of configurations, from a small scale configuration with only one disk control cluster to super-huge configuration with several tens of disk control clusters connected to each other.

Embodiment 5

Figure 10:
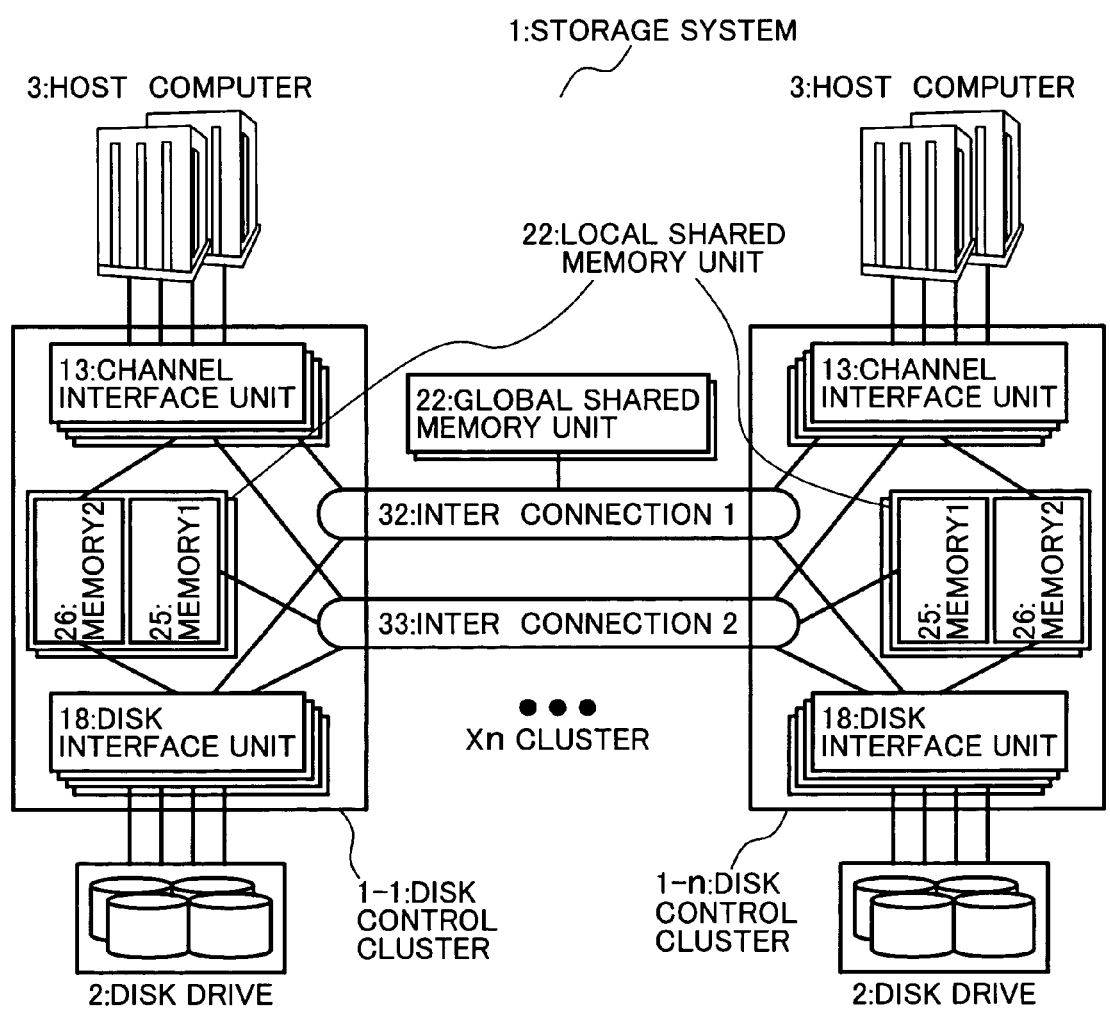
FIG. 10 is a diagram showing a configuration of a storage system of Embodiment 5 according to the present invention.

FIG. 10 shows Embodiment 5 according to the present invention.

Hereinbelow, Embodiment 5 employed interconnection using switches. Alternatively, however, the interconnection may be composed of a bus, for example, as long as they are connected each other and transfers control information and data.

As shown in FIG. 10, a plurality of disk control clusters 1-1 to 1-n makes up a storage system 1.

The disk control clusters 1-1 to 1-n has interfaces with host computers 3 (channel interface unit) 13, interfaces with disk drives 2 (disk interface unit) 18, local shared memory units 22 having memory 1:25 and 2:26. The channel interface unit 13 and the disk interface unit 18 directly connect to the memory 2 inside the disk control cluster.

An interconnection 1:32 across the plurality of the disk control clusters 1-1 to 1-n connects between the channel interface units 13 and the disk interface units 18. Global shared memory units 21 connect with the interconnection 1:32. Specifically, through the interconnection 1:32, the global shared memory unit 22 is accessible from all the channel interface units 13 and disk interface units 18.

An interconnection 2:33 across the plurality of the disk control clusters 1-1 to 1-n connects the channel interface units 13 and the disk interface units 18 and the memory 1.

Figure 14:
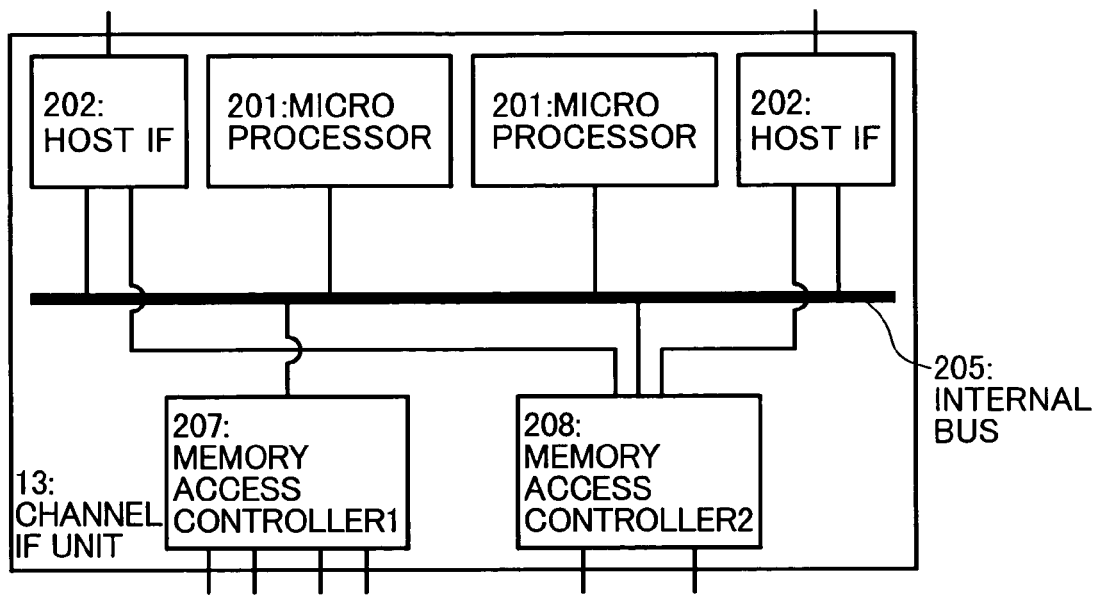
FIG. 14 is a diagram showing another configuration of a channel interface unit composing a storage system according to the present invention.

FIG. 14 shows a specific example of the channel interface unit 13.

The channel interface unit 13 has two interfaces (host interface) 202 to the host computers 3, two microprocessors 201 for controlling input to and output from the host computers 3, an access controller 1 (memory access controller) 207 for controlling access to the global shared memory unit 21 or memory 2:26, an access controller 2 (memory access controller 2) 208 for controlling access to memory 1:25. The channel interface unit 13 transfers data between the host computer 3 and the memory 1. Also, it transfers control information between the microprocessor 201 and the global shared memory unit 21 or the memory 2. An internal bus 205 connects the microprocessors 201 with the host interfaces 202, and the memory access controller 207 connects to the internal bus 205. The memory access controller 208 directly connects to the host interfaces 202, and connects to the internal bus 205.

Figure 15:
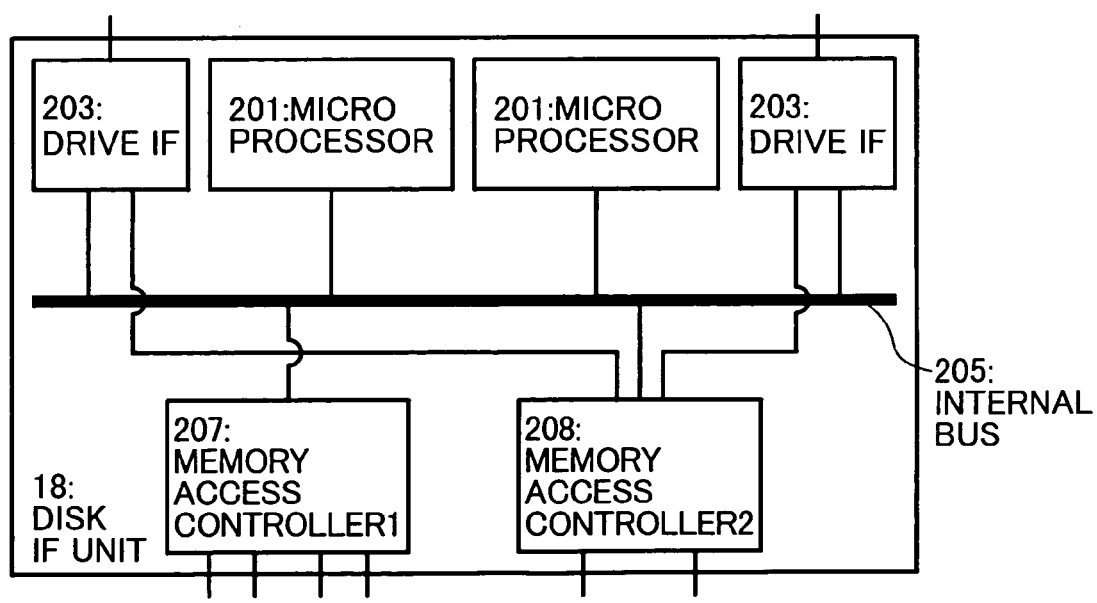
FIG. 15 is a diagram showing another configuration of a disk interface unit composing a storage system according to the present invention.

FIG. 15 shows a specific example of the disk interface unit 18.

The disk interface unit 18 has two interfaces (drive interface) 203 to the disk drives 2, two microprocessors 201 for controlling input to and output from the disk drives 2, and an access controller 1 (memory access controller 1) 207 for controlling access to the global shared memory unit 21 or the memory 2, and an access controller 2 (memory access controller 2) 208 for controlling access to the memory 1. The disk interface unit 18 transfers data between the disk drives 2 and the memory 1. Also, it transfers control information between the microprocessor 201 and the global shared memory unit 21 or the memory 2.

An internal bus 205 connects the microprocessors 201 and the drive interfaces 203. The memory access controller 207 connects to the internal bus 205. The memory access controller 208 directly connects to two drive interfaces 203, and connects to the internal bus 205 also.

Moreover, the disk interface unit 18 performs execution of a RAID function.

One disk control cluster is composed as a rack or a module, but it functions as a disk controller thereof.

A specific example of the storage system has the similar configuration as Embodiment 3 as shown in FIG. 7 in terms of a connecting configuration of the channel interface unit 13 and the disk interface unit 18 and the memory 2:26, the interconnection 1:32, and the global shared memory unit 21.

Moreover, a connecting configuration of the channel interface unit 13 and the disk interface unit 18, and the memory 1 and the interconnection 2:33 is a configuration of Embodiment 1 as shown in FIG. 3 except that the global shared memory unit 21 is removed therefrom.

The global shared memory unit 21 stores management information of the disk control clusters 1-1 to 1-n (the management information herein includes, for example, information on storage areas which the disk control cluster manages, operation status of the disk control clusters, and configuration information thereof).

The memory 1 temporarily stores data to be recorded in the disk drive 2.

The memory 2 stores control information of the disk control cluster (the control information, for example, is information about data transfer control between channel interface units 13 and disk interface units 18 and the memory 1:25, and management information of the data to be stored in the disk drive 2)

In FIG. 10, switches outside the disk control cluster that forms the interconnection 1:32, switches outside the disk control cluster that forms the interconnection 2:33, and the global shared memory unit 21 may be mounted on a box, and each of modularized disk control clusters 1-1 to 1-n along therewith may be mounted in one rack. Moreover, each of the disk control cluster 1-1 to 1-n may be distributed to different place as a separate rack, each place separates away from each other.

With reference to FIG. 10, an example of reading data recorded in a storage system 1 from a host computer 3 connected to the disk controller 1-1 will be described.

First, the host computer 3 makes a request for reading of data to the channel interface unit 13 within the disk control cluster 1-1 connected with the host computer 3 themselves.

The microprocessor 201 within the channel interface unit 13 receives the request and accesses to the memory 2:26 within its own disk control cluster 1-1 so as to check in which disk drive 2 the requested data is stored.

The memory 2:26 stores a conversion table which shows addresses that are actually recorded in the disk drives 2 corresponding to the address of the requested data. Thus, the microprocessor 201 can check which disk drive has the requested data stored therewithin.

When the requested data exists in the disk drive 2 connected to own disk control cluster 1-1, the microprocessor 201 in the channel interface unit 13, that received the request, accesses to the memory 2:26 in its own disk control cluster 1-1 to check if the requested data is stored in the memory 1:25.

The memory 2:26 stores directory information of data stored in the memory 1:25 and thus, it is possible to check if the memory 1:25 has the requested data stored therein.

Accordingly, when the data is in the memory 1:25 in the disk control cluster 1-1, the data is transferred to the channel interface unit 13, and finally to the host computer 3.

If the data does not exists in the memory 1:25 in its own disk control cluster 1-1, the microprocessor 201 in the channel interface unit 13 gives control information to a microprocessor 201 in a disk interface unit 18 connected with a disk drive 2 with the requested data stored therein. The control information contains information on how to process the data request, i.e., reading the requested data and storing it in the memory 1:25. The microprocessor 201 in the disk interface unit 18 receives the control information, reads the data from the disk drive 2 where the requested data is stored, and transfers the requested data to the memory 1:25 in its own disk control cluster 1-1 so as to store therein.

Specifically, the microprocessor 201 in the channel interface unit 13 issues control information showing how to process the above data request, and stores it in the control information block (job control block) of the memory 2:26.

The microprocessor 201 in the disk interface unit 18 watches the control information block of the memory 2:26 by polling. When the issued controlled information described above exists in the above-described control information block (job control block), the microprocessor 201 in the disk interface unit 18 reads the data from the disk drive 2 with the requested data stored therein, and transfers the requested data to the memory 1:25 in its own disk control cluster 1-1 so as to store therein.

After storing the requested data in the memory 1:25, the microprocessor 201 in the disk interface unit 18 informs the address in the memory 1:25 in which the data is stored to the microprocessor 201 in the channel interface unit 13 that issued the control information via the control information block in the memory 2:26. The microprocessor 201 in the channel interface unit 13 receives the information, reads the data from the memory 1:25, and transfers it to the host computer 3.

Specifically, the microprocessor 201 in the disk interface unit 18 issues control information describing a completion of the process and the address where the data is stored after storing the requested data in the memory 1:25 so as to store in the control information block of the local shared memory unit 2:26. The microprocessor 201 in the channel interface unit 13, which issued the control information, watches the control information block in the memory 2:26 by polling.

If the control information issued by the microprocessor 201 in the disk interface unit 18 exists, the microprocessor 201 in the channel interface 13 reads the data from the memory 1:25 according to the address of the data stored in the memory 1:25, transfers it to the channel interface unit 13, and further transfers to the host computer 3.

When the disk drive 2 connected to the disk control cluster 1-1 does not have the requested data stored therein, the microprocessor 201 in the channel interface unit 13 that received the request accesses to the global shared memory unit 21 via the interconnection 1:32 to search for a disk control cluster having a disk drive 2 with a requested data stored therein connected thereto.

The global shared memory unit 21 has a conversion table stored therein. The conversion table shows which disk control cluster connected to a disk drive with a requested data corresponds the address of the requested data, thereby the microprocessor 201 can search which disk control cluster has the requested data stored therein.

When the disk drive 2 connected to the disk control cluster 1-n has the requested data stored therein, the microprocessor 201 in the channel interface unit 13, which received the request, requests the disk control cluster 1-n via the global shared memory unit 21 that the requested data to be stored in the memory 1:25 in the disk control cluster 1-n.

The global shared memory unit 21 has areas for storing control information for exchanging data requests between disk control clusters, which is divided for each disk control cluster to which a request is sent. The microprocessor 201 in the channel interface unit 13, that receives the request, stores the control information and the address of the requested data in an area of the disk control cluster 1-n in the global shared memory unit 21. The control information contains information on a request to store the requested data in the memory 1:25 of the disk control cluster 1-n.

The microprocessor 201 in the disk interface unit 18 in the disk control cluster 1-n watches the request areas to its own disk control cluster in the global shared memory unit 21 by polling.

When the data request is within the request areas where the control information for requesting data is stored, whether or not the requested data is stored in the memory 1:25 in own disk control cluster 1-n is checked The memory 2:26 has directory information of the data stored in the memory 1:25, and thus, it is possible to check if the requested data exists in the memory 1:25.

If the data exists in the memory 1:25 of its own disk control cluster 1-n, the microprocessor 201 in the channel interface unit 13, that received the data request, within the disk control cluster 1-1 receives information, via the global shared memory unit 21, that the memory 1:25 in the disk control cluster 1-n has stored the data.

After receiving the information, the microprocessor 201 in the channel interface unit 13 that received data request within the disk control cluster 1-1 transfers the requested data from the memory 1:25 in the disk control cluster 1-n via the interconnection 2:33, and further transfers to the host computer 3.

When the data does not exists within the memory 1:25 of the disk control cluster 1-n, the microprocessor 201 in the disk interface unit 18 of the disk control cluster 1-n issues control information to the microprocessor 201 in the disk interface unit 18 connected with the disk drive 2 with the requested data stored therein, and stores it in the control information block (job control block) of the memory 2:26. The control information contains information on how to process data request, i.e., reading the requested data and storing it in the memory 1:25.

The microprocessor 201 in the disk interface unit 18 watches the control information block in the memory 2:26 by polling. If the control information issued as described above exists in the above-described control information block (job control block), the microprocessor 201 in the disk interface unit 18 reads the data from the disk drive 2 where the requested data is stored, and transfers the requested data to the memory 1:25 in its own disk control cluster 1-n via the interconnection 2:33 to store.

The process thereafter is similar to the process done in a case where the requested data is in the above-described memory 1:25.

Data lengths of the control information and the data are different by several thousands times, thereby time of one data transfer is greatly different. Therefore, when using the same interconnection and the memory, both of them interfere with transfer from each other. In the present embodiment, the interconnection 1:32 for transferring the control information and the interconnection 2:33 for transferring the data are separated, thereby not interfering each other's transfer, thus enabling to improve performance.

Embodiment 6

Figure 11:
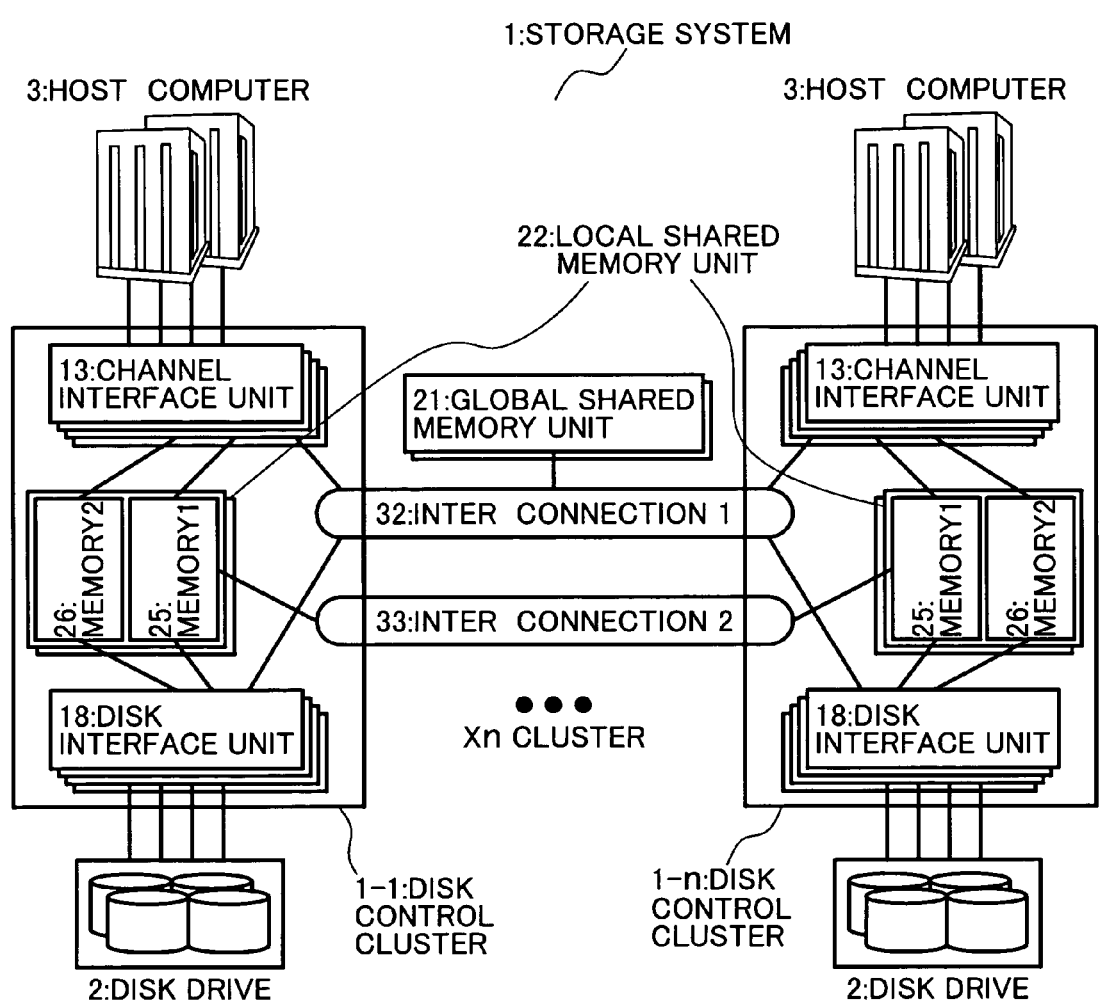
FIG. 11 is a diagram showing a configuration of a storage system of Embodiment 6 according to the present invention.

FIG. 11 shows Embodiment 6 according to the present invention.

As shown in FIG. 11, a configuration of a storage system 1 including a disk controlling unit 1-1 to 1-n is similar to a configuration of Embodiment 5 as shown in FIG. 10 except connection between the channel interface unit 13 and disk interface unit 18 and the memory 1:25 and the interconnection 2:33.

The channel interface unit 13 and the disk interface unit 18, directly connect to the memory 1:25 in the disk control cluster. The memories 1:25 are connected between a plurality of the disk control clusters 1-1 to 1-n via the interconnection 2:33.

As described above, in Embodiment 6, the channel interface unit 13 and the disk interface unit 18 directly connect to the memory 1:25 in the disk control units 1-1 to 1-n, thereby an accessing time to the memory 1:25 becomes shorter than connecting them via the interconnection 2:33 as shown in Embodiment 5.

The configurations of the channel interface unit 13 and the disk interface unit 18 are similar to the configurations thereof in Embodiment 5 as respectively shown in FIG. 14 and FIG. 15.

One disk control cluster may be composed as a rack or a module, but it functions as a disk controller thereof.

A connecting configuration for the channel interface unit 13 and the disk interface unit 18 and the memory 2:26 and the interconnection 1:32 and the global shared memory unit 21 in a specific example of the storage system 1 is similar to that of Embodiment 3 as shown in FIG. 7. A connecting configuration of the channel interface unit 13 and the disk interface unit 18 and the memory 1:25 and the interconnection 2:33 are similar to the configuration of Embodiment 2 as shown in FIG. 5 except that the global shared memory unit 21 is removed therefrom.

The global shared memory unit 21 stores management information of disk control clusters 1-1 to 1-n (the management information, for example, is information about storage areas each disk control cluster manages, and operation status and configurations information of the disk control clusters).

The memory 1:25 temporarily stores data to be recorded in disk drives 2. Moreover, the memory 2:26 stores control information of the disk control cluster (the control information, for example, is information about data transfer control between the channel interface units 13 and disk interface units 18 and the memory 1:25, and management information of the data to be stored in the disk drives 2).

In FIG. 11, switches outside the disk control cluster that forms the interconnection 1:32, switches outside the disk control cluster that forms the interconnection 2:33, and the global shared memory unit 21 may be mounted on a box, and each of modularized disk control clusters 1-1 to 1-n along therewith may be mounted in one rack. Moreover, each of the disk control cluster 1-1 to 1-n may be distributed to different place as a separate rack, each place separates away from each other.

In the present embodiment, when reading/writing of data from the host computer 3 to the storage system 1, each units within the storage system 1 operates similarly to Embodiment 5 except that the channel interface unit 13 and the disk interface unit 18 gains direct access to the memory 1:25, and the channel interface unit 13 and the disk shared memory unit 18 gains access to the memory 1:25 of another disk control cluster via the memory controller (not shown) in the memory 1:25.

Data lengths of the control information and the data are different by several thousands times, thereby time of one data transfer is greatly different. Therefore, when using the same interconnection and the memory, both of them interfere with transfer from each other. In the present embodiment, the interconnection 1:32 for transferring the control information and the interconnection 2:33 for transferring the data are separated, thereby not interfering each other's transfer, thus enabling to improve performance.

Embodiment 7

Figure 16:
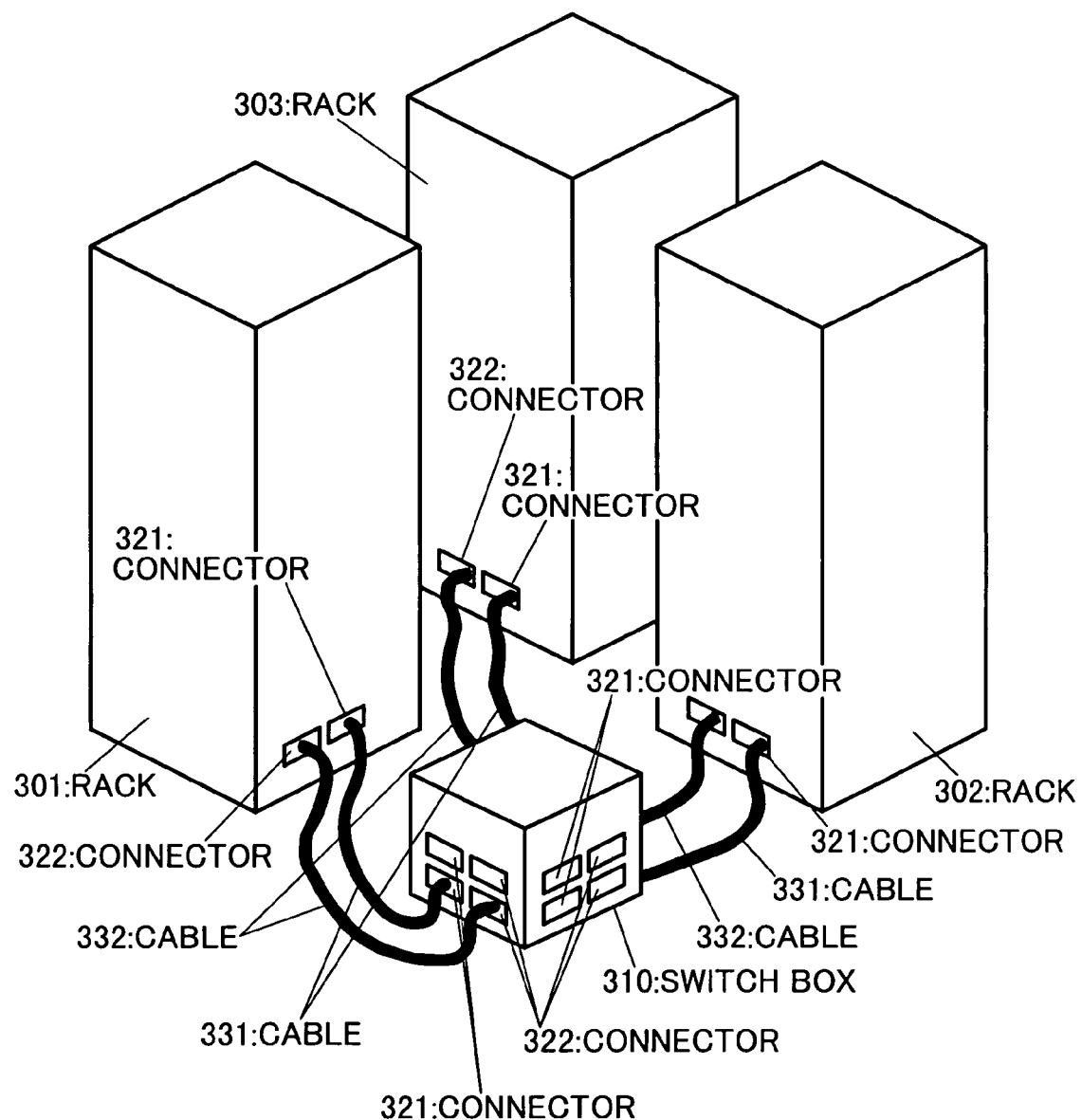
FIG. 16 is a diagram illustrating a method for increasing disk control clusters according the present invention.

FIGS. 16 to 18 show one example of an increase process of the disk control cluster in the storage system 1 of Embodiment 1.

As shown in FIG. 16, a switch box 310 is mounted as a separate rack.

A GSW 115 and global shared memory units 21 are mounted in the switch box 310.

The switch box 310 has eight connectors 321 and eight connectors 322, and eight disk control clusters can be connected. The figures show a case where the three disk control clusters are connected.

Each of access paths 136 of the GSW 115 connects to the connectors 321 and 322. A number for connectors described above is only an example, and not limited thereto. Each disk control cluster 1-1 to 1-3 is respectively mounted on racks 301 to 303. The racks 301 to 303 have connectors 321 and 322, and two access paths 136 connects respectively to the connectors 321 and 322.

Via cables 331 and 322, respective connectors 321 and 322 connects switch box 301 with the racks 301 to 303.

When increasing the disk control cluster in the storage system 1, the following process is performed. If there are extra connectors for increasing disk control clusters in the switch box 310, the cables 331 and 332 connect with the extra connectors.

If there are no extra connector, the switch box with the GSW mounted thereon is prepared, and the switch box connect in multiple layers, where connectors thereof connect to cables 331 and 332.

FIG. 17 shows a corresponding table 400 between a GSW port and a cluster number, which shows disk control cluster connecting to a GSW 115 port, i.e., disk control cluster comprising the storage system 1. FIG. 18 shows a corresponding table 405 between a cluster number and logical volume numbers, which shows logical volumes that the disk control clusters manage. Along with the above-describe step for connecting each part accordingly, the corresponding tables 400 and 405 are rewritten.

The global shared memory unit 21 stores the corresponding table 400 between a GSW port and a cluster number and the corresponding table 405 between a cluster number and logical volume numbers, and a service processor (SVP) can rewrite the tables.

The SVP, in many instances, is note-type personal computer. The note-type personal computer displays the tables shown in FIG. 17 and FIG. 18, respectively, on the screen, and rewrites the content of the table on while being displayed thereon.

FIGS. 17 and 18 shows corresponding tables between a GSW port and a cluster number 400 and between a cluster number and logical volume numbers 405, respectively, before and after an increase of the disk control cluster. Herein, five disk control clusters consists the storage system 1 before an increase thereof, and one more disk cluster is added thereto.

As shown in FIG. 17, the fourth port of the GSW port number 401 is not connected. A cable of cluster 5 connects to No. 4 port, and thereafter, a corresponding column of the cluster number 402 in a row for port number 4 is re-written from "not connected" to "5" on the SVP's display.

Thereafter, as shown in FIG. 18, the logical volume number 406 corresponding to the cluster number 5 of the cluster number 402 is rewritten from "not connected" to "16640 to 20735". Herein, the logical volume number 406 shows a range of logical volumes that each cluster manages.

Before increasing, the maximum of the logical volume number is 16639, and the increased disk control cluster has 4096 logical volume. Thus, a range of the logical volumes that the disk control cluster 5 manages is 16640 to 20735. A number of logical volumes do not have to be continuous.

As described above, a new disk control cluster may be increased to the storage system.

According to the present invention, a disk control cluster has: one or a plurality of channel interface units for interfacing with host computers; one or a plurality of disk interface units for interfacing with disk drives; local shared memory units for storing data to be read out of or written to the disk drives and control information about data transfer and management information of the disk drives; and a first connection portion where the channel interface unit and disk interface unit and the local shared memory unit connect thereto. In response to a data read/write request from the host computer, the channel interface unit transfers data between the interface to the host computer and the local shared memory unit. The disk interface unit transfers data between the disk drives and the local shared memory unit. The first connection portion of the disk control cluster has a connecting path to a second connection portion where a global shared memory unit connects to, the global shared memory unit being for storing management information of the disk control clusters.

According to the present invention, a disk control cluster has: one or a plurality of channel interface units for interfacing with host computers; one or a plurality of disk interface units for interfacing with disk drives; and local shared memory units for storing management information of the disk drive, control information about data transfer, and data to be read out of and written to the disk drives.

The channel interface units and the disk interface units has connected to the local shared memory units. In response to a data read/write request from the host computer, the channel interface unit transfers data between the interface to the host computer and the local shared memory unit. The disk interface unit transfers data between the disk drives and the local shared memory unit. The local shared memory unit in the disk control cluster has a connecting path to a second connection portion where a global shared memory unit connects to, the global shared memory unit being for storing management information of the disk control clusters.

According to the present invention, a storage system including a plurality of disk control clusters and global shared memory units for storing management information of the disk control clusters, the disk control clusters having one or a plurality of channel interface units for interfacing with host computers; one or a plurality of disk interface units for interfacing with disk drives; local shared memory units for storing management information of the disk drive, control information about data transfer, and data to be read out of and written to the disk drives; and a first connection portion where the channel interface units and disk interface units and the local shared memory units connect thereto, in which the channel interface unit and the disk interface unit connected the local shared memory units, in response to a read/write request of data from the host computer, the channel interface unit transfers data between the interface to the host computer and the local shared memory units and the disk interface unit transfers data between the disk drives and the local shared memory units, the global shared memory unit having connected to a second connection portion by a connecting path, and the first connection portion of the disk control clusters connecting to the second connection portion via connecting paths.

According to the present invention, an increase method of a disk control cluster is characterized in that in a storage system including a plurality of disk control clusters and global shared memory units for storing management information of the disk control clusters, the disk control clusters having one or a plurality of channel interface units for interfacing with host computers; one or a plurality of disk interface units for interfacing with disk drives; local shared memory units for storing management information of the disk drives, control information about data transfer, and data to be read out of and written to the disk drives; and a first connection portion where the channel interface unit and disk interface unit and the local shared memory unit connect thereto, in which the channel interface unit and the disk interface unit connected the local shared memory units in response to a read/write request of data from the host computer, the channel interface unit transfers data between the interface to the host computer and the local shared memory units and the disk interface unit transfers data between the disk drives and the local shared memory units, the global shared memory unit having connected to a second connection portion by connecting paths, and the first connection portion of the disk control clusters connecting to the second connection portion via connecting paths, the increase method including steps of: providing one or more first connectors connecting with the first connection portion to a rack having each of the disk control clusters mounted thereon; providing one or more second connectors connecting with the second connection portion to a rack having the second connection portion for connecting the global shared memory units and the global shared memory unit mounted thereon; and connecting the first connector of each of the disk control clusters comprising the storage system to the second connector via connecting paths, in which when increasing a disk control cluster to a storage system, the first connector of an increased disk control cluster is connected to the second connector by the connecting path.

In the increase method of the disk control cluster described above, the global shared memory units stores a first table showing whether or not the disk control cluster connects to the second connector having the second connecting portion, and a second table showing storage areas which the disk control cluster connected with the second connector manages, and as a disk control cluster increases, valid information regarding the increased disk control cluster is added to the first and second tables.

According to the present invention, it is possible to provide a storage system with a configuration of a desirable scalability. Therefore, with an architecture of high reliability and high-performance of the disk control cluster can deal with a wide range of configurations from a small scale configuration with one disk control cluster to a super huge configuration with tens of disk control clusters connected therein, in the storage system operating a plurality of disk control clusters as one system.

What is claimed is:

1. A disk control cluster, comprising:
one or a plurality of channel interface units for interfacing with host computers;
one or a plurality of disk interface units for interfacing with disk drives;
local shared memory units for storing data to be read out of or written to said disk drives and control information about transfer of said data and management information of said disk drives; and
first connection portion for connecting to said channel interface unit and disk interface unit and said local shared memory unit, wherein
said channel interface unit transfers data between said host computers and said interface and said local shared memory to read/write request of data from said host computers;
said disk interface unit reads out of or writes data by transferring data between said disk unit and said local shared memory; and
said first connection portion has a path for connecting to second connection portion connected to global shared memory which stores said management information of said each disk control cluster.

2. A disk control cluster, comprising:
one or a plurality of channel interface units for interfacing with host computers;
one or a plurality of disk interface units for interfacing with disk drives;
local shared memory units for storing data to be read out of or written to said disk drives and control information about transfer of said data and management information of said disk drives; and
first connection portion for connecting to said channel interface unit and disk interface unit and said local shared memory unit, wherein
said local shared memory is connected to said channel interface unit and said disk interface unit;
said channel interface unit transfers data between said host computers and said interface and said local shared memory to read/write request of data from said host computers;
said disk interface unit reads out of or writes data by transferring data between said disk unit and said local shared memory;
said local shared memory has a path for connecting to second connection portion connected to global shared memory which stores said management information of said each disk control cluster.

3. A storage system comprising:
disk control cluster which has
one or a plurality of channel interface units for interfacing with host computers;
one or a plurality of disk interface units for interfacing with disk drives;
local shared memory units for storing data to be read out of or written to said disk drives and control information about transfer of said data and management information of said disk drives;
first connection portion for connecting to said channel interface unit and disk interface unit and said local shared memory unit; and
which said local shared memory is connected to said channel interface unit and said disk interface unit;
said channel interface unit transfers data between said host computers and sad interface and said local shared memory to read/write request of data from said host computers;
said disk interface unit reads out of or writes data by transferring data between said disk unit and said local shared memory, and
global shared memory which stores management information of said each disk control cluster; wherein
said local shared memory is connected to second connection portion connected to said global shred memory; and
said first connection portion of said each disk control cluster is connected to said second connection portion by a path.

4. A storage system according to claim 3, further comprising:
one or a plurality of first connectors connected to said first connection portion in said disk control cluster;
plural second connectors connected to said second connection portion; and
said first connector is connected to said second connector by a path, wherein
said first connector of increased disk control cluster is connected to said second connector by a path when increasing said disk control cluster.

5. A storage system according to claim 4, wherein
said global shared memory stores first information which indicates whether said disk control cluster is connected to said each second connector and second information which indicates memorial area which said disk control cluster managed,
said first and second information is added to information about increased disk control cluster.

* * * * *